US012675691B2

(12) United States Patent
Palla et al.

(10) Patent No.: US 12,675,691 B2
(45) Date of Patent: Jul. 7, 2026

(54) DECOMPOSING A DECONVOLUTION INTO MULTIPLE CONVOLUTIONS

(71) Applicant: Intel Corporation, Santa Clara, CA (US)

(72) Inventors: Alessandro Palla, Pisa (IT); David Thomas Bernard, Kilcullen (IE); Niall Hanrahan, Galway (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/935,163

(22) Filed: Sep. 26, 2022

(65) Prior Publication Data

US 2023/0016455 A1 Jan. 19, 2023

(51) Int. Cl.
G06N 20/00 (2019.01)
G06F 17/15 (2006.01)
(Continued)

(52) U.S. Cl.
CPC .............. G06N 3/08 (2013.01); G06F 17/15 (2013.01); G06F 40/30 (2020.01); G06F 40/35 (2020.01);
(Continued)

(58) Field of Classification Search
CPC .......... G06N 3/08; G06N 3/045; G06N 3/042; G06N 3/084; G06N 3/082; G06N 3/0985;
(Continued)

(56) References Cited

U.S. PATENT DOCUMENTS 11,049,000 B2 * 6/2021 Andreopoulos ....... G06N 3/048
11,631,004 B2 * 4/2023 Kruglov ................. G06N 3/082
706/39
(Continued)

FOREIGN PATENT DOCUMENTS

CN 111723904 A 9/2020
CN 111937009 A 11/2020
(Continued)

OTHER PUBLICATIONS

Xiaohan Ding et al., "Diverse Branch Block Building a Convolution as an Inception-like Unit", 2021 IEEE/CVF Conference on Computer Vision and Pattern Recognition (CVPR), pp. 10881-10890.*

*Primary Examiner* — Srirama Channavajjala
(74) *Attorney, Agent, or Firm* — Akona IP PC

(57) ABSTRACT
A deconvolution can be decomposed into multiple convolutions. Results of the convolutions constitute an output of the deconvolution. Zeros may be added to an input tensor of the deconvolution to generate an upsampled input tensor. Subtensors having the same size as the kernel of the deconvolution may be identified from the upsampled input tensor. A subtensor may include one or more input activations and one or more zeros. Subtensors having same distribution patterns of input activations may be used to generate a reduced kernel. The reduced kernel includes a subset of the kernel. The position of a weight in the reduced kernel may be the same as the positions of an input activation in the subtensor. Multiple reduced kernels may be generated based on multiple subtensors having different distribution patterns of activations. Each of the convolutions may use the input tensor and a different one of the reduced kernels.

22 Claims, 22 Drawing Sheets

(51) Int. Cl.

| | |
|---|---|
| *G06F 40/00* | (2020.01) |
| *G06F 40/30* | (2020.01) |
| *G06F 40/35* | (2020.01) |
| *G06F 40/40* | (2020.01) |
| *G06N 3/00* | (2023.01) |
| *G06N 3/042* | (2023.01) |
| *G06N 3/045* | (2023.01) |
| *G06N 3/08* | (2023.01) |
| *G06N 3/084* | (2023.01) |

(52) U.S. Cl.
CPC ............. *G06F 40/40* (2020.01); *G06N 3/042* (2023.01); *G06N 3/045* (2023.01); *G06N 3/084* (2013.01); *G06N 20/00* (2019.01)

(58) Field of Classification Search
CPC .......... G06N 3/063; G06N 20/00; G06N 5/01; G06F 17/15; G06F 40/30; G06F 40/35; G06F 40/40; G06F 40/295; G06F 40/284; G06F 40/237
See application file for complete search history.

(56) References Cited

U.S. PATENT DOCUMENTS

| | | | | |
|---|---|---|---|---|
| 11,663,473 | B2 * | 5/2023 | Song | G06F 17/153 |
| | | | | 706/20 |
| 2016/0379109 | A1 * | 12/2016 | Chung | G06N 3/0464 |
| | | | | 706/26 |
| 2018/0121533 | A1 * | 5/2018 | Magnani | G06F 16/248 |
| 2018/0129936 | A1 * | 5/2018 | Young | G06N 3/045 |
| 2018/0210862 | A1 * | 7/2018 | Akerib | G06F 17/16 |
| 2018/0285715 | A1 * | 10/2018 | Son | G06N 3/08 |
| 2018/0308201 | A1 * | 10/2018 | Appu | G06N 3/063 |
| 2019/0138898 | A1 * | 5/2019 | Song | G06N 3/08 |
| 2020/0285887 | A1 * | 9/2020 | Lee | G06F 18/24 |
| 2021/0182676 | A1 * | 6/2021 | Zlateski | G06N 20/10 |
| 2022/0391702 | A1 | 12/2022 | Lin et al. | |
| 2023/0016455 | A1 | 1/2023 | Palla et al. | |

FOREIGN PATENT DOCUMENTS

| | | | |
|---|---|---|---|
| EP | 3480740 | A1 | 5/2019 |
| EP | 3940600 | A1 * | 1/2022 |
| WO | WO 2021054990 | A1 * | 3/2021 |
| WO | 2021172797 | A1 | 9/2021 |

* cited by examiner

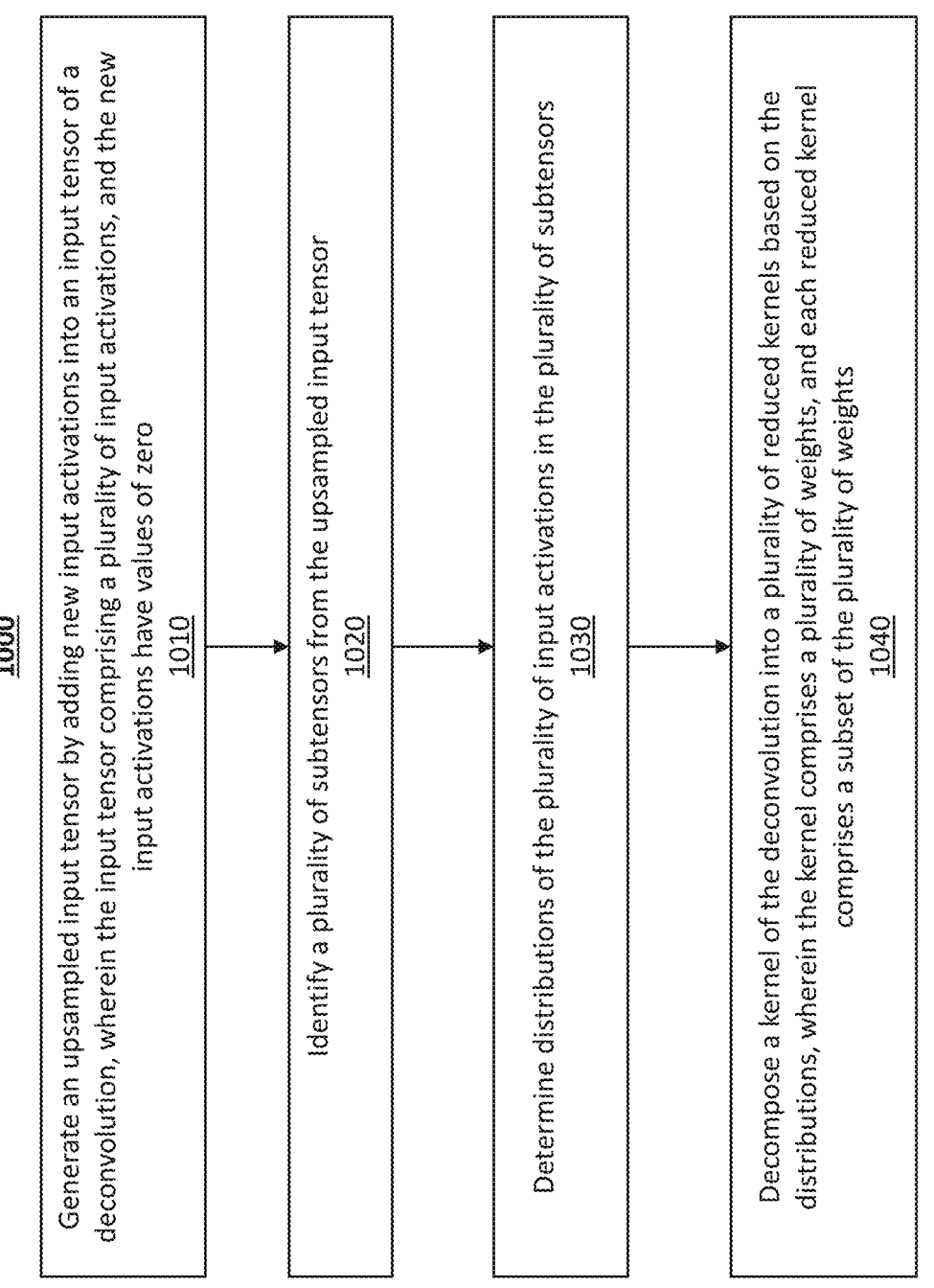

1000

Generate an upsampled input tensor by adding new input activations into an input tensor of a deconvolution, wherein the input tensor comprising a plurality of input activations, and the new input activations have values of zero
1010

Identify a plurality of subtensors from the upsampled input tensor
1020

Determine distributions of the plurality of input activations in the plurality of subtensors
1030

Decompose a kernel of the deconvolution into a plurality of reduced kernels based on the distributions, wherein the kernel comprises a plurality of weights, and each reduced kernel comprises a subset of the plurality of weights
1040

FIG. 10

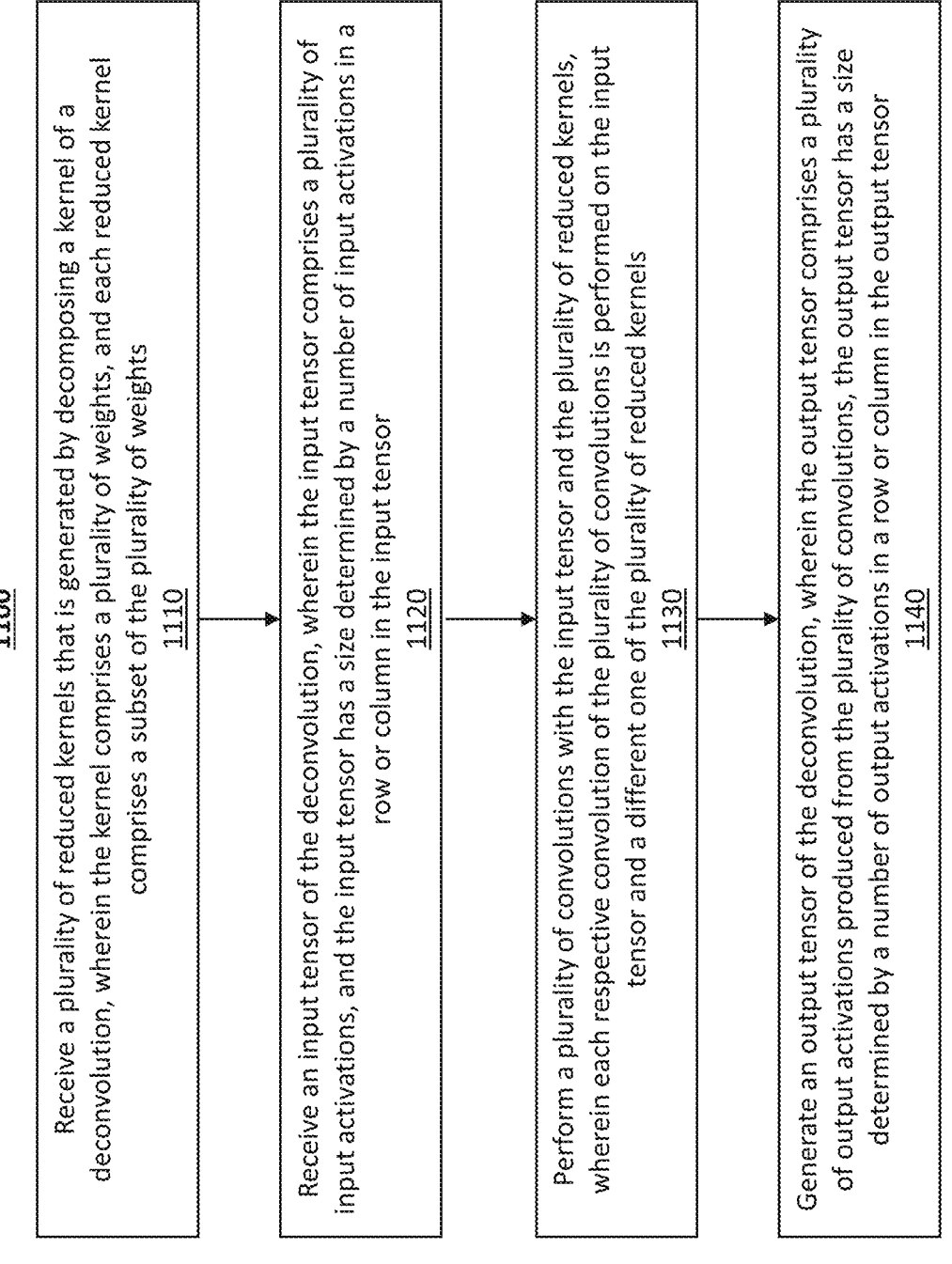

1100

Receive a plurality of reduced kernels that is generated by decomposing a kernel of a deconvolution, wherein the kernel comprises a plurality of weights, and each reduced kernel comprises a subset of the plurality of weights
1110

Receive an input tensor of the deconvolution, wherein the input tensor comprises a plurality of input activations, and the input tensor has a size determined by a number of input activations in a row or column in the input tensor
1120

Perform a plurality of convolutions with the input tensor and the plurality of reduced kernels, wherein each respective convolution of the plurality of convolutions is performed on the input tensor and a different one of the plurality of reduced kernels
1130

Generate an output tensor of the deconvolution, wherein the output tensor comprises a plurality of output activations produced from the plurality of convolutions, the output tensor has a size determined by a number of output activations in a row or column in the output tensor
1140

FIG. 11

DECOMPOSING A DECONVOLUTION INTO MULTIPLE CONVOLUTIONS

TECHNICAL FIELD

This disclosure relates generally to neural networks, and more specifically, decomposing a deconvolution into multiple convolutions.

BACKGROUND

Deep neural networks (DNNs) are used extensively for a variety of artificial intelligence applications ranging from computer vision to speech recognition and natural language processing due to their ability to achieve high accuracy. However, the high accuracy comes at the expense of significant computation cost. DNNs have extremely high computing demands as each inference can require hundreds of millions of MAC (multiply-accumulate) operations as well as a large amount of data to read and write. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 10 is a flowchart showing a method of decomposing a deconvolution into multiple convolutions, in accordance with various embodiments.

FIG. 11 is a flowchart showing a method of performing a deconvolution, in accordance with various embodiments.

DETAILED DESCRIPTION

Overview

Figure 1:
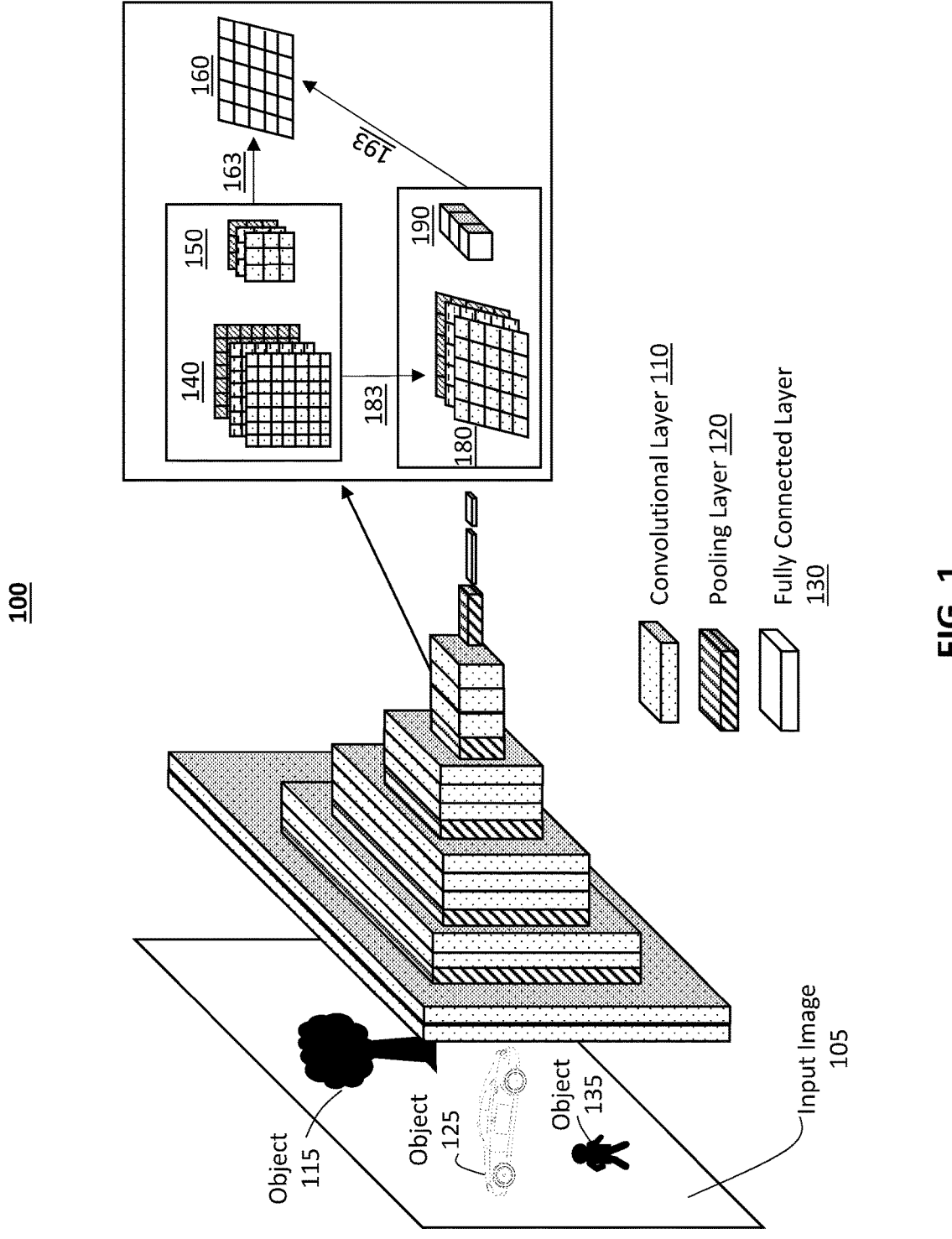
FIG. 1 illustrates an example DNN, in accordance with various embodiments.

The last decade has witnessed a rapid rise in AI (artificial intelligence) based data processing, particularly based on DNN. DNNs are widely used in the domains of computer vision, speech recognition, image, and video processing mainly due to their ability to achieve beyond human-level accuracy. The significant improvements in DNN model size and accuracy coupled with the rapid increase in computing power of execution platforms have led to the adoption of DNN applications even within resource constrained mobile and edge devices that have limited energy availability.

One key feature of image processing DNN models is the process of encoding the features of the original image by pooling and sampling the input and subsequently upsampling the features using the deconvolution operation to restore the original size of the image. The deconvolution operation (also referred to as fractional stride convolution, transposed convolution, or up-convolution) can be seen as the reverse of the convolution operation. A convolution downsizes the tensor, but a deconvolution upsizes the tensor.

Currently available technologies for deconvolution usually require an upsampling operation. This happens because a deconvolution with stride higher than 1 has an equivalent convolution supported with fractional stride. In the upsampling operation, the input tensor can be zero-padded in order to implement the deconvolution operation. However, the upsampling operation typically cannot be done on hardware efficiently. The upsampling is usually implemented as a software kernel in the DNN accelerator running the DNN model. This implementation suffers from several drawbacks since the implementation efficiency can be very poor on this kind of microarchitecture. Also, it requires the upsampling layer to be stored in the local memory, which can almost double the layer memory footprint and may even force the compiler to spill the upsampling layer.

Embodiments of the present disclosure may improve on at least some of the challenges and issues described above by providing a system and method for decomposing a deconvolution into multiple convolutions. Each of the convolutions may be performed with an input tensor of the deconvolution and a reduce kernel. The reduced kernels for the convolutions may be generated form the kernel of the deconvolution and have smaller sizes than the kernel of the deconvolution. Results of the convolutions constitute an output tensor of the deconvolution. The convolutions may also be referred to as reduced convolutions as they use reduced kernels.

The decomposition of the deconvolution may be done by a deconvolution module that is coupled to a DNN accelerator performing the reduced convolutions. The deconvolution module may be implemented at least partially in software. An example of the deconvolution module may generate an upsampled input tensor from the input tensor of the deconvolution by adding zeros to the input tensor. The deconvolution module may add zeros to edges of the input tensor or insert zeros between activations of the input tensors. The deconvolution module may determine positions and the number of the zeros based on the kernel size, padding size, and the stride size of the deconvolution.

The deconvolution module may further decompose the kernel into the reduced kernels abased on the upsampled input tensor. The upsampled input tensor may be decomposed into subtensors, the size of which is the same as the kernel. A subtensor may include one or more zeros and one or more activations. The deconvolution module may select one or more weights from the kernel based on positions of the one or more activations in the subtensor and form a reduced kernel with the one or more weights. The deconvolution module may generate multiple reduced kernels based on subtensors having different activation distribution patterns. Each reduced kernel is used for a different reduced convolution, in which the reduced kernel is applied on the input tensor of the deconvolution. The reduced convolution produces one or more output activations of the output tensor. The output activations produced by the reduced convolutions can be interleaved to form the output tensor.

The deconvolution module may determine memory addresses for input activations in the input tensor of the deconvolution and for output activations in the output tensor of the deconvolution. The DNN accelerator can use the memory addresses of the input activations determined by the deconvolution module to select and read proper input activations for each of the reduced convolutions. The DNN accelerator can also use the memory addresses of the output activations determined by the deconvolution module to write output activations produced from each of the reduced convolutions into proper locations to facilitate interleaving output activations from different reduced convolutions.

By using the deconvolution module in the present disclosure, the upsampling of the input tensor of the deconvolution may be implemented in software. Thus, the drawbacks of causing hardware inefficiency in executing upsampling layers can be overcome. The DNN accelerator may use data provide by the deconvolution module to perform reduced convolutions with reduced kernels and the input tensor. Compared with the currently available technologies that performs a single convolution on the upsampled input tensor having a larger size than the input tensor, the reduced convolutions in the present invention may require less computing resource. Thus, the performance and efficiency of the DNN accelerator can be better. Also, the DNN accelerator can be implemented in device having limited computing resource.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The DNN systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN

FIG. 1 illustrates an example DNN 100, in accordance with various embodiments. For purpose of illustration, the DNN 100 in FIG. 1 is a convolutional neural network (CNN). In other embodiments, the DNN 100 may be other types of DNNs. The DNN 100 is trained to receive images and output classifications of objects in the images. In the embodiments of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers. In an inference of the DNN 100, the layers of the DNN 100 execute tensor computation that includes many tensor operations, such as convolution (e.g., multiply-accumulate (MAC) operations, etc.), pooling operations, elementwise operations (e.g., elementwise addition, elementwise multiplication, etc.), other types of tensor operations, or some combination thereof.

The convolutional layers 110 summarize the presence of features in the input image 105. The convolutional layers 110 function as feature extractors. The first layer of the DNN 100 is a convolutional layer 110. In an example, a convolutional layer 110 performs a convolution on an input tensor 140 (also referred to as input feature map (IFM) 140) and a filter 150. As shown in FIG. 1, the IFM 140 is represented by a 7×7×3 three-dimensional (3D) matrix. The IFM 140 includes 3 input channels, each of which is represented by a 7×7 two-dimensional (2D) matrix. The 7×7 2D matrix includes 7 input elements (also referred to as input points) in each row and 7 input elements in each column. The filter 150 is represented by a 3×3×3 3D matrix. The filter 150 includes 3 kernels, each of which may correspond to a different input channel of the IFM 140. A kernel is a 2D matrix of weights, where the weights are arranged in columns and rows. A kernel can be smaller than the IFM. In the embodiments of FIG. 1, each kernel is represented by a 3×3 2D matrix. The 3×3 kernel includes 3 weights in each row and 3 weights in each column. Weights can be initialized and updated by backpropagation using gradient descent. The magnitudes of the weights can indicate importance of the filter 150 in extracting features from the IFM 140.

The convolution includes MAC operations with the input elements in the IFM 140 and the weights in the filter 150. The convolution may be a standard convolution 163 or a depthwise convolution 183. In the standard convolution 163, the whole filter 150 slides across the IFM 140. All the input channels are combined to produce an output tensor 160 (also referred to as output feature map (OFM) 160). The OFM 160 is represented by a 5×5 2D matrix. The 5×5 2D matrix includes 5 output elements (also referred to as output points) in each row and 5 output elements in each column. For purpose of illustration, the standard convolution includes one filter in the embodiments of FIG. 1. In embodiments where there are multiple filters, the standard convolution may produce multiple output channels in the OFM 160.

The multiplication applied between a kernel-sized patch of the IFM 140 and a kernel may be a dot product. A dot product is the elementwise multiplication between the kernel-sized patch of the IFM 140 and the corresponding kernel, which is then summed, always resulting in a single value. Because it results in a single value, the operation is often referred to as the "scalar product." Using a kernel smaller than the IFM 140 is intentional as it allows the same kernel (set of weights) to be multiplied by the IFM 140 multiple times at different points on the IFM 140. Specifically, the kernel is applied systematically to each overlapping part or kernel-sized patch of the IFM 140, left to right, top to bottom. The result from multiplying the kernel with the IFM 140 one time is a single value. As the kernel is applied multiple times to the IFM 140, the multiplication result is a 2D matrix of output elements. As such, the 2D output matrix (i.e., the OFM 160) from the standard convolution 163 is referred to as an OFM.

In the depthwise convolution 183, the input channels are not combined. Rather, MAC operations are performed on an individual input channel and an individual kernel and produce an output channel. As shown in FIG. 1, the depthwise convolution 183 produces a depthwise output tensor 180. The depthwise output tensor 180 is represented by a 5×5×3 3D matrix. The depthwise output tensor 180 includes 3 output channels, each of which is represented by a 5×5 2D matrix. The 5×5 2D matrix includes 5 output elements in each row and 5 output elements in each column. Each output channel is a result of MAC operations of an input channel of the IFM 140 and a kernel of the filter 150. For instance, the first output channel (patterned with dots) is a result of MAC operations of the first input channel (patterned with dots) and the first kernel (patterned with dots), the second output channel (patterned with horizontal strips) is a result of MAC operations of the second input channel (patterned with horizontal strips) and the second kernel (patterned with horizontal strips), and the third output channel (patterned with diagonal stripes) is a result of MAC operations of the third input channel (patterned with diagonal stripes) and the third kernel (patterned with diagonal stripes). In such a depthwise convolution, the number of input channels equals the number of output channels, and each output channel corresponds to a different input channel. The input channels and output channels are referred to collectively as depthwise channels. After the depthwise convolution, a pointwise convolution 193 is then performed on the depthwise output tensor 180 and a 1×1×3 tensor 190 to produce the OFM 160.

The OFM 160 is then passed to the next layer in the sequence. In some embodiments, the OFM 160 is passed through an activation function. An example activation function is the rectified linear activation function (ReLU). ReLU is a calculation that returns the value provided as input directly, or the value zero if the input is zero or less. The convolutional layer 110 may receive several images as input and calculate the convolution of each of them with each of the kernels. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 performs a convolution on the OFM 160 with new kernels and generates a new feature map. The new feature map may also be normalized and resized. The new feature map can be kernelled again by a further subsequent convolutional layer 110, and so on.

In some embodiments, a convolutional layer 110 has 4 hyperparameters: the number of kernels, the size F kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depthwise separable convolution, transposed convolution, and so on. The DNN 100 includes 16 convolutional layers 110. In other embodiments, the DNN 100 may include a different number of convolutional layers.

The pooling layers 120 down-sample feature maps generated by the convolutional layers, e.g., by summarizing the presence of features in the patches of the feature maps. A pooling layer 120 is placed between 2 convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receive an input operand. The input operand defines the output of the convolutional layers 110 and pooling layers 120 and includes the values of the last feature map generated by the last pooling layer 120 in the sequence. The fully connected layers 130 apply a linear combination and an activation function to the input operand and generate an individual partial sum. The individual partial sum may contain as many elements as there are classes: element i represents the probability that the image belongs to class i. Each element is therefore between 0 and 1, and the sum of all is worth one. These probabilities are calculated by the last fully connected layer 130 by using a logistic function (binary classification) or a softmax function (multi-class classification) as an activation function.

In some embodiments, the fully connected layers 130 classify the input image 105 and return an operand of size N, where N is the number of classes in the image classification problem. In the embodiments of FIG. 1, N equals 3, as there are 3 objects 115, 125, and 135 in the input image. Each element of the operand indicates the probability for the input image 105 to belong to a class. To calculate the probabilities, the fully connected layers 130 multiply each input element by weight, make the sum, and then apply an activation function (e.g., logistic if N=2, softmax if N>2). This is equivalent to multiplying the input operand by the matrix containing the weights. In an example, the individual partial sum includes 3 probabilities: a first probability indicating the object 115 being a tree, a second probability indicating the object 125 being a car, and a third probability indicating the object 135 being a person. In other embodiments where the input image 105 includes different objects or a different number of objects, the individual partial sum can be different.

Example Convolution and Deconvolution

Figure 2:
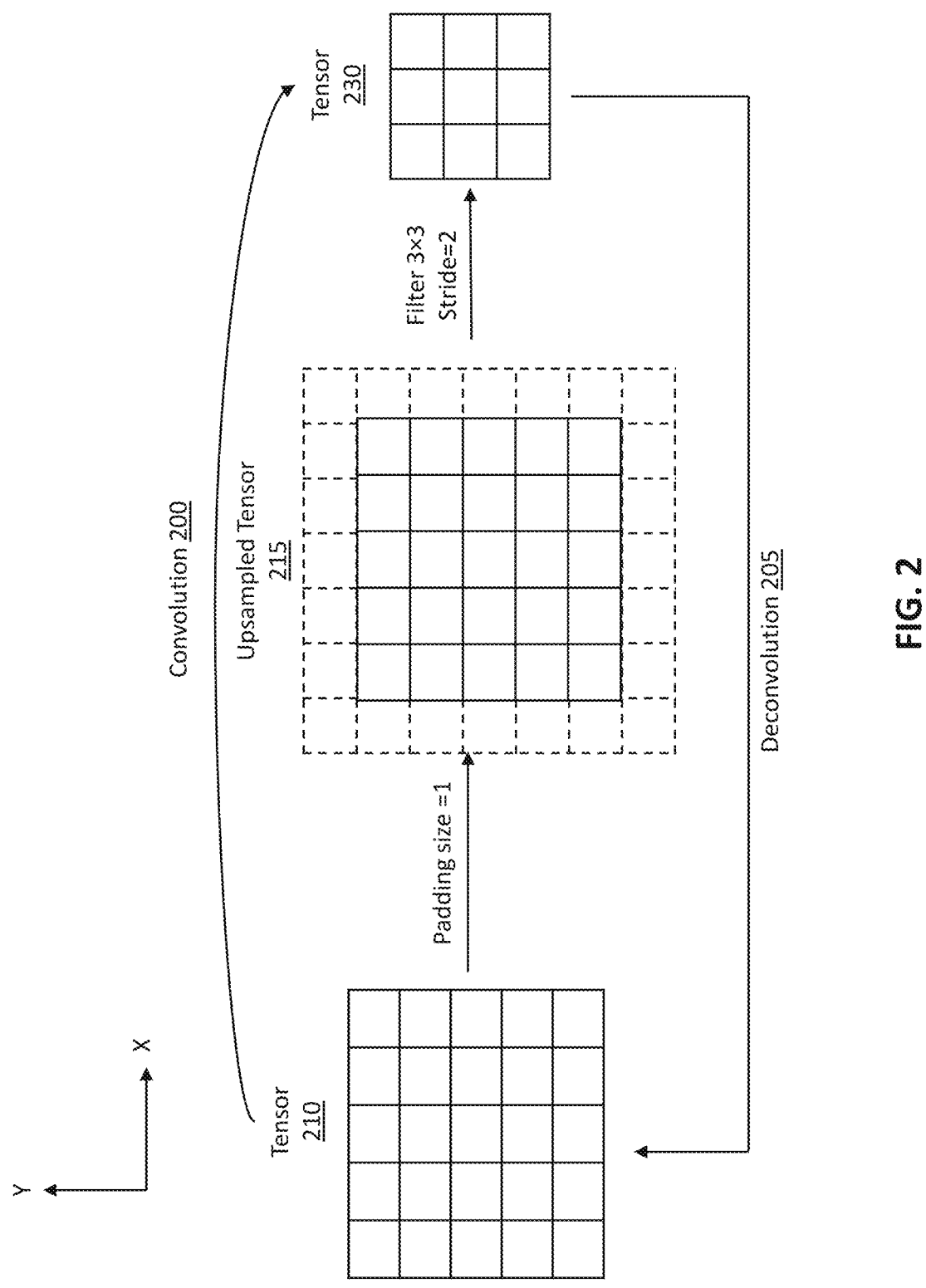
FIG. 2 illustrates an example convolution and an example deconvolution, in accordance with various embodiments.

FIG. 2 illustrates an example convolution 200 and an example deconvolution 205, in accordance with various embodiments. The convolution may be a convolution in a convolutional layer of a DNN, e.g., a convolutional layer 110 in FIG. 1. The convolution is executed on a tensor 210 and filters 220 (individually referred to as "filter 220"). A result of the convolution is a tensor 230. The deconvolution 205 is a reverse of the convolution 200. The input of the deconvolution is the tensor 230, and the output of the deconvolution is the tensor 210. For purpose of simplicity and illustration, FIG. 2 shows the tensors 210 and 230 in a X-Y two-dimensional plane. The tensors 210 and 230 may be three-dimensional matrixes. The tensors 210 and 230 may each includes a plurality of channels. A depth of the tensor 210 or 230 in a direction perpendicular to the X-Y plane may be determined by the number of channels in the tensor 210 or 230.

The tensor 210 includes first activations arranged in a 2D array. A first activation is a data point in the tensor 210. Each first activation in the tensor 210 may be represented by a (X, Y) coordinate. The tensor 210 has a spatial size $H_1 \times W_1$, where $H_1$ is the height of the 3D matrix (i.e., the length along the Y axis, which indicates the number of first activations in a column in the 2D matrix of each input channel) and $W_1$ is the width of the 3D matrix (i.e., the length along the X-axis, which indicates the number of first activations in a row in the 2D matrix of each input channel). For purpose of simplicity and illustration, the tensor 210 has a spatial size of 5×5.

The tensor 230 includes second activations arranged in a 2D array. A second activation is a data point in the tensor 230. Each second activation in the tensor 230 may be represented by a (X, Y) coordinate. The tensor 230 has a spatial size $H_2 \times W_2$, where $H_2$ is the height of the 2D matrix (i.e., the length along the Y axis, which indicates the number of second activations in a column in the 2D matrix) and $W_2$ is the width of the 2D matrix (i.e., the length along the X-axis, which indicates the number of second activations in a row in the 2D matrix of each input channel). For purpose of simplicity and illustration, the tensor 230 has a spatial size of 3×3, which is smaller than the size of the tensor 310.

The convolution 200 may be represented by a kernel size, a padding size, and a stride size. The kernel size indicates the layout of weights in the kernel. The kernel size may be represented as $H_k \times W_k$, where $H_k$ is the height of the kernel (i.e., the length along the Y axis, which indicates the number of weight in a column in the kernel) and $W_k$ is the width of the kernel (i.e., the length along the X-axis, which indicates the number of weights in a row in the kernel). The padding size indicates the number of dummy activations to be added to the input of the convolution 200, e.g., the number of row(s) and column(s) of zeros to be added to the tensor 210. The stride size indicates the number of row(s) and column(s) traversed per slide during the convolution 200.

In the embodiments of FIG. 2, the kernel size is 3×3, the padding size is 1, and the stride size is 2. As shown in FIG. 2, the tensor 210 is converted to an upsampled tensor 215 through a padding process based on the padding size. A row of zeros is added to both the top and bottom edges of the tensor 210. A column of zeros is added to both the left and right edges of the tensor 210. The upsampled tensor 215 has a size of 7×7. Then the kernel slides across the upsampled tensor 215 with the stride size of 2. Each sliding step includes an MAC operation on an input operand and the kernel and results in an activation in the tensor 230. The input operand is a subtensor in the upsampled tensor 215 and has the same size as the kernel. For instance, in the first sliding step, an MAC operation may be performed on the kernel and a first input operand. The first input operand may include nine activations in the upsampled tensor 215, e.g., activations with (X,Y) coordinates including (0,0), (0,1), (0,2), (1,0), (1,1), (1,2), (2,0), (2,1), and (2,2). The result of the MAC operation may be an activation (e.g., (0, 0)) in the tensor 230. In the second sliding step, another MAC operation may be performed on the kernel and a second input operand. The second input operand includes nine activations in the upsampled tensor 215. The (X,Y) coordinates of the activations in the second input operand may be (2,0), (2,1), (2,2), (3,0), (3,1), (3,2), (4,0), (4,1), and (4,2). The result of this MAC operation may be another activation (e.g., (1,0)) in the tensor 230. As all the sliding steps are finished, the tensor 230 is produced. The convolution 200 is a downsampling operation, as the tensor 230 is smaller than the tensor 210.

The deconvolution 205 is the reverse of the convolution 200. The deconvolution 205 is a upsampling operation, as the tensor 230 is the input and the tensor 210 is the output. The deconvolution 205 may also be referred to as a transposed convolution or fractionally stride convolution since stride over the tensor 210 is equivalent to fractional stride over the tensor 230. For instance, a stride of 2 over the tensor 210 is ½ stride over the tensor 230. The deconvolution 205 may also be represented by the kernel size, padding size, and stride size of the convolution 200.

The deconvolution 205 may be executed as a new convolution, which may be different from the convolution 200. The new convolution has the tensor 210 as an output and a new tensor larger than the tensor 210 as an input. The new tensor may have a size larger than the tensor 210. The new tensor may be generated by padding the tensor 210. In some embodiment, the deconvolution 205 may be decomposed into a plurality of reduced convolutions. The decomposition of the deconvolution 205 may include a decomposition of the kernel into a plurality of reduced kernels based on the new tensor. A reduced kernel has a smaller size than the kernel. A reduced convolution may be a convolution on a reduced kernel and the tensor 230. The output of the deconvolution 205 may be produced by interleaving results of the plurality of reduced convolutions. More details regarding decomposing deconvolutions are provided below in conjunction with FIGS. 3-8.

Example Deconvolutions

Figure 3:
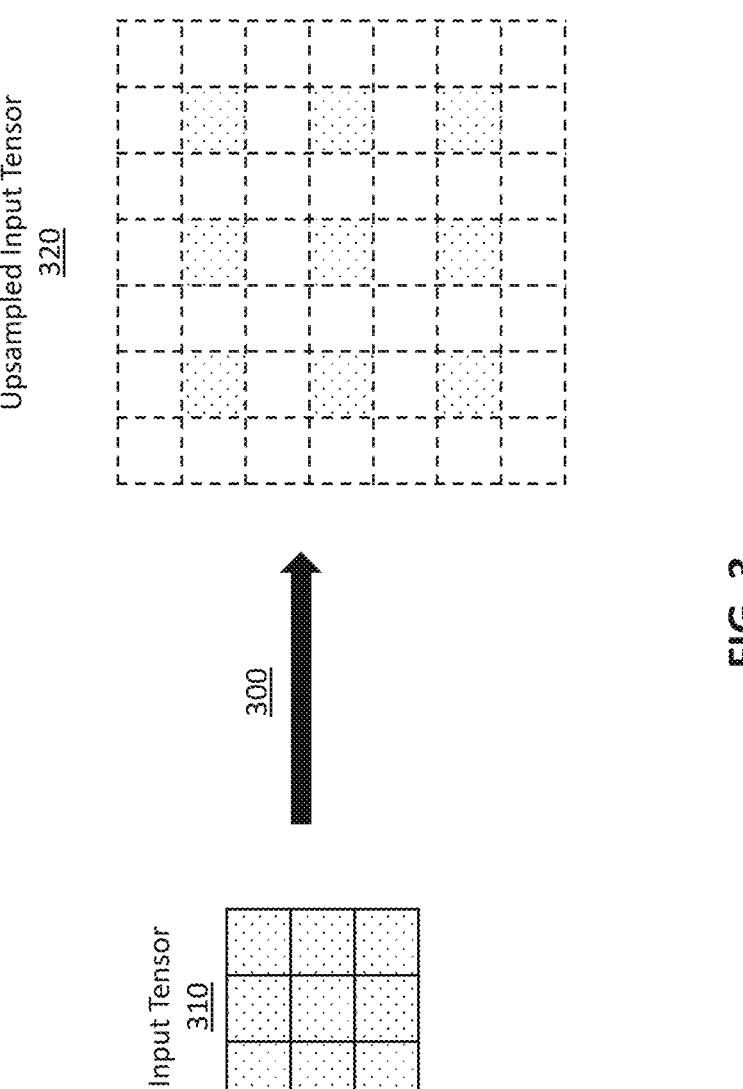
FIG. 3 illustrating a padding process for a deconvolution, in accordance with various embodiments.

FIG. 3 illustrating a padding process 300 for a deconvolution, in accordance with various embodiments. The deconvolution may be a 3×3s2p1 deconvolution, i.e., the kernel size is 3×3, the stride size is 2, and the padding size is 1. An example of the deconvolution is the deconvolution 205 in FIG. 2.

The input of the deconvolution in FIG. 3 is an input tensor 310. The input tensor 310 has a size of 3×3. Zeroed values are added to the input tensor 310 during the padding process 300 to generate an upsampled input tensor 320. The padding process includes adding zeroed values to edges of the input tensor 310 based on a padding size. The padding size may be determined based on the kernel size and the padding size of the deconvolution. For instance, the padding size may be a result of the kernel size of the deconvolution minus the padding size of the deconvolution and further minus 1. In the embodiments of FIG. 3, the kernel size of the deconvolution is 3 and the padding size of the deconvolution is 1, so padding size for the upsampling the input tensor is 1. Thus, one row of zeros is added to both the top and bottom edges of the tensor 210. Also, one column of zeros is added to both the left and right edges of the tensor 210.

The padding process also includes adding zeroed values between activations in the input tensor 310. The number of zeroed values added between activations in the input tensor 310 may equal $S_{deconv}-1$, where $S_{deconv}$ is the stride size of the deconvolution. In the embodiments of FIG. 3, $S_{deconv}=2$ so $S_{deconv}-1=1$. As shown in FIG. 3, one zeroed value is added between every two activations in the input tensor 310. The padding process produces a 7×7 tensor, i.e., the upsampled input tensor 320. For purpose of illustration, the activations of the input tensor 310 are highlighted with a dotted pattern, and the zeroed values added to the input tensor 310 are not highlighted.

Figure 4A:
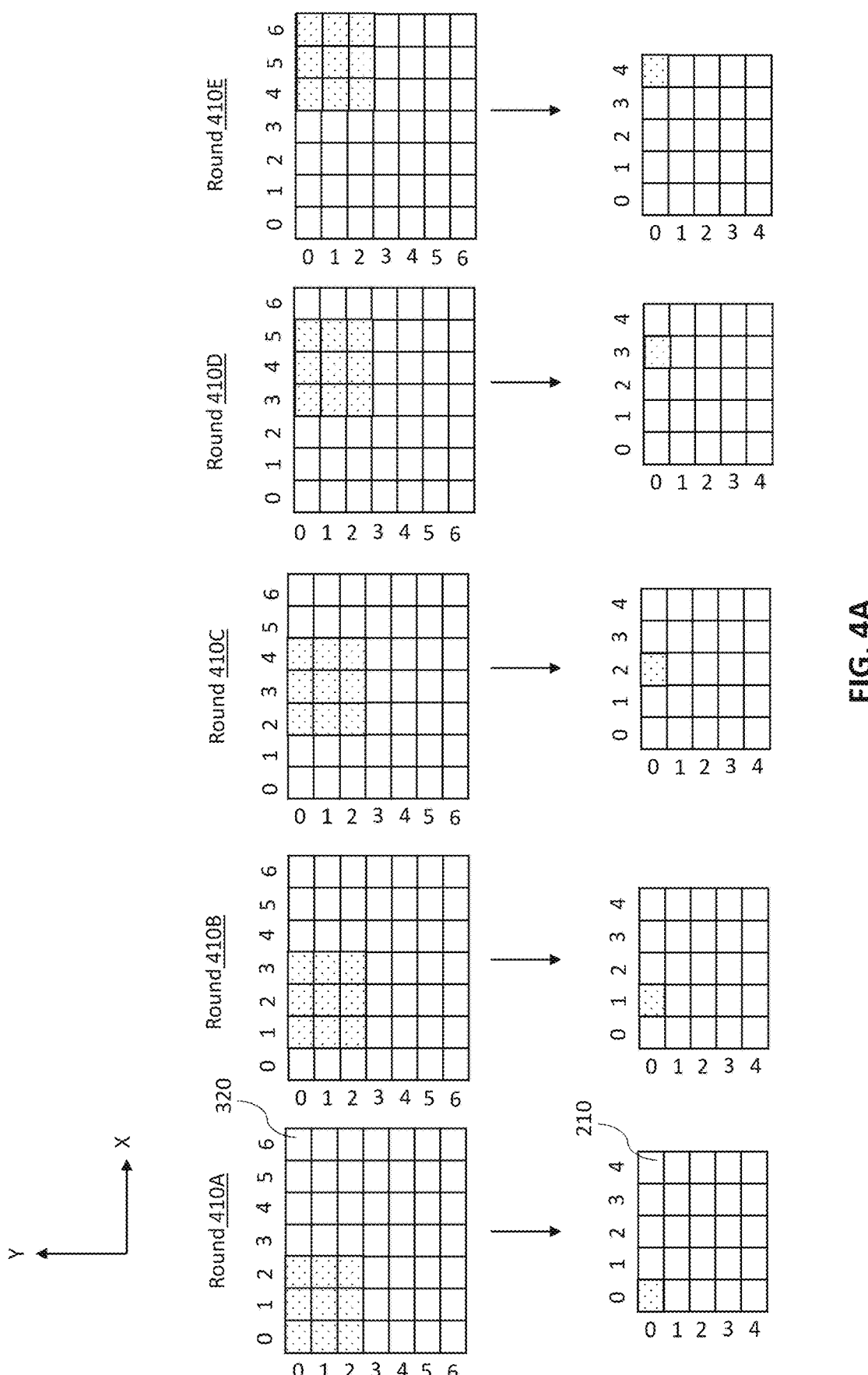
FIGS. 4A and 4B illustrate an example deconvolution converted to a single convolution, in accordance with various embodiments.
Figure 4B:
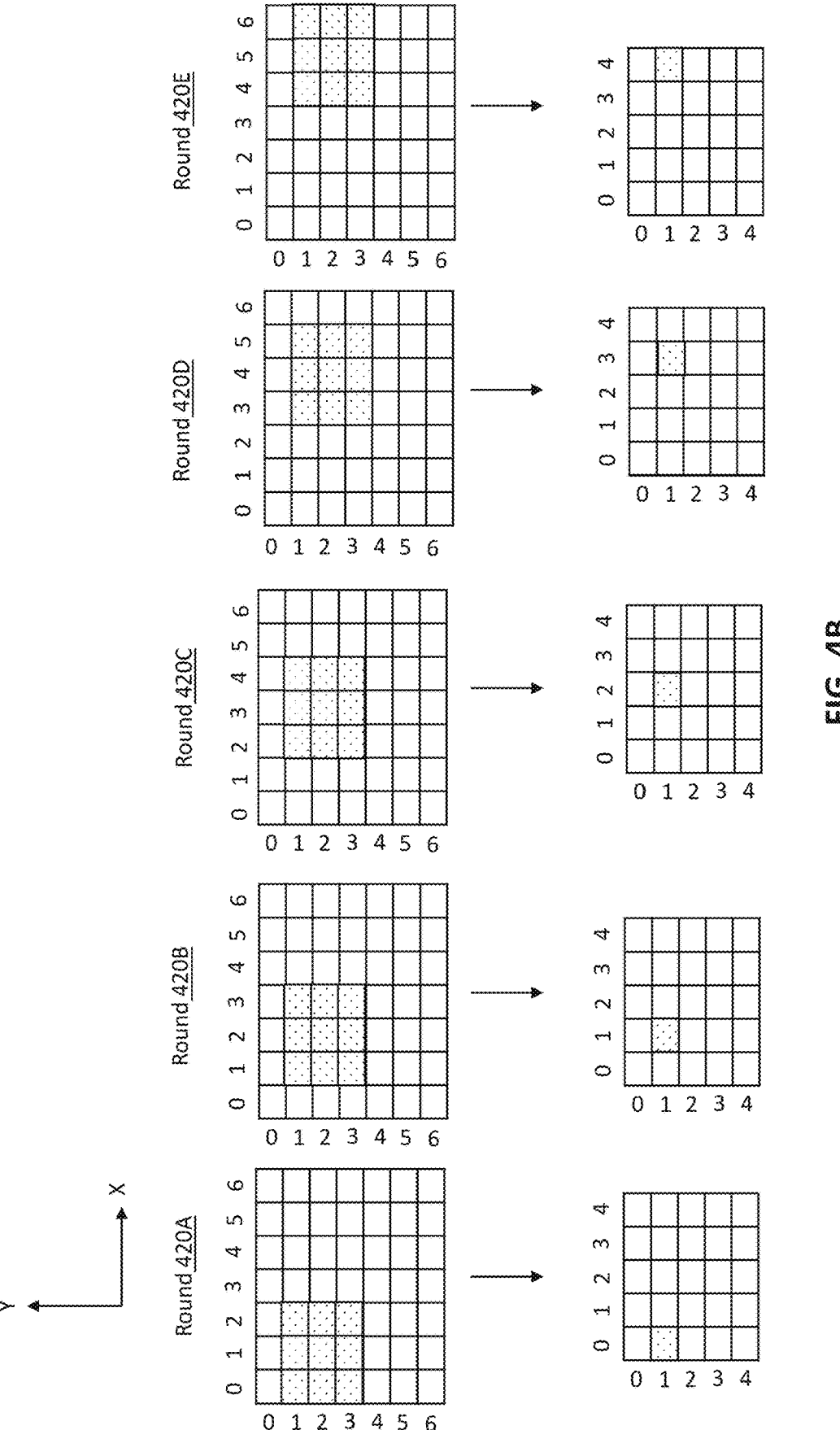

FIGS. 4A and 4B illustrate an example deconvolution converted to a single convolution, in accordance with various embodiments. The deconvolution may be a 3×3s2p1 deconvolution In the embodiments of FIGS. 4A and 4B, the deconvolution is converted to a convolution having a 3×3 kernel and a stride size of 1. An example of the input tensor of the convolution may be the upsampled input tensor 320 in FIG. 3. An example of the output tensor of the convolution (i.e., the output tensor of the deconvolution) is the tensor 210.

FIG. 4A shows that the kernel slides across the upsampled input tensor 320 along the X-axis in rounds 410A-410E (collectively referred to as "rounds 410" or "round 410"). Each round 410 includes an MAC operation of the kernel and a portion of the upsampled input tensor 320 that has the same size as the kernel. The result of the MAC operation is a data point in the first row of the tensor 210. As the stride size of the convolution is 1, the kernel moves over one column in the upsampled input tensor 320 after each round 410.

After the rounds 410, the kernel moves down along the Y axis. As the stride size is 1, the kernel moves down by one row in the upsampled input tensor 320. FIG. 4B shows that the kernel slides across the upsampled input tensor 320 along the X-axis in rounds 420A-420E (collectively referred to as "rounds 420" or "round 420"). Each round 420 includes an MAC operation of the kernel and a portion of the upsampled input tensor 320 that has the same size as the kernel. The result of the MAC operation is a data point in the second row of the tensor 210. As the stride size of the convolution is 1, the kernel moves over one column in the upsampled input tensor 320 after each round 420. Even though not shown in FIGS. 4A and 4B, the sliding process may continue till all the data points in the tensor 210 are produced.

As the convolution converted from the deconvolution has a larger input tensor. It can take more computing resources in the DNN accelerator to store, transfer, and process the input tensor. Also, the number of MAC operations that the DNN accelerator needs to perform for the convolution is larger. Therefore, the conversion of the deconvolution to the single convolution impairs the efficiency of the DNN accelerator.

FIGS. 5A-5F illustrate an example deconvolution converted to multiple convolutions, in accordance with various embodiments, in accordance with various embodiments. The deconvolution may be the 3×3s2p1 deconvolution described above. The deconvolution has a kernel 520 shown in FIG. 5A, an input tensor 505 shown in FIGS. 5B-5E, and an output tensor 530 shown in FIG. 5F.

Figure 5A:
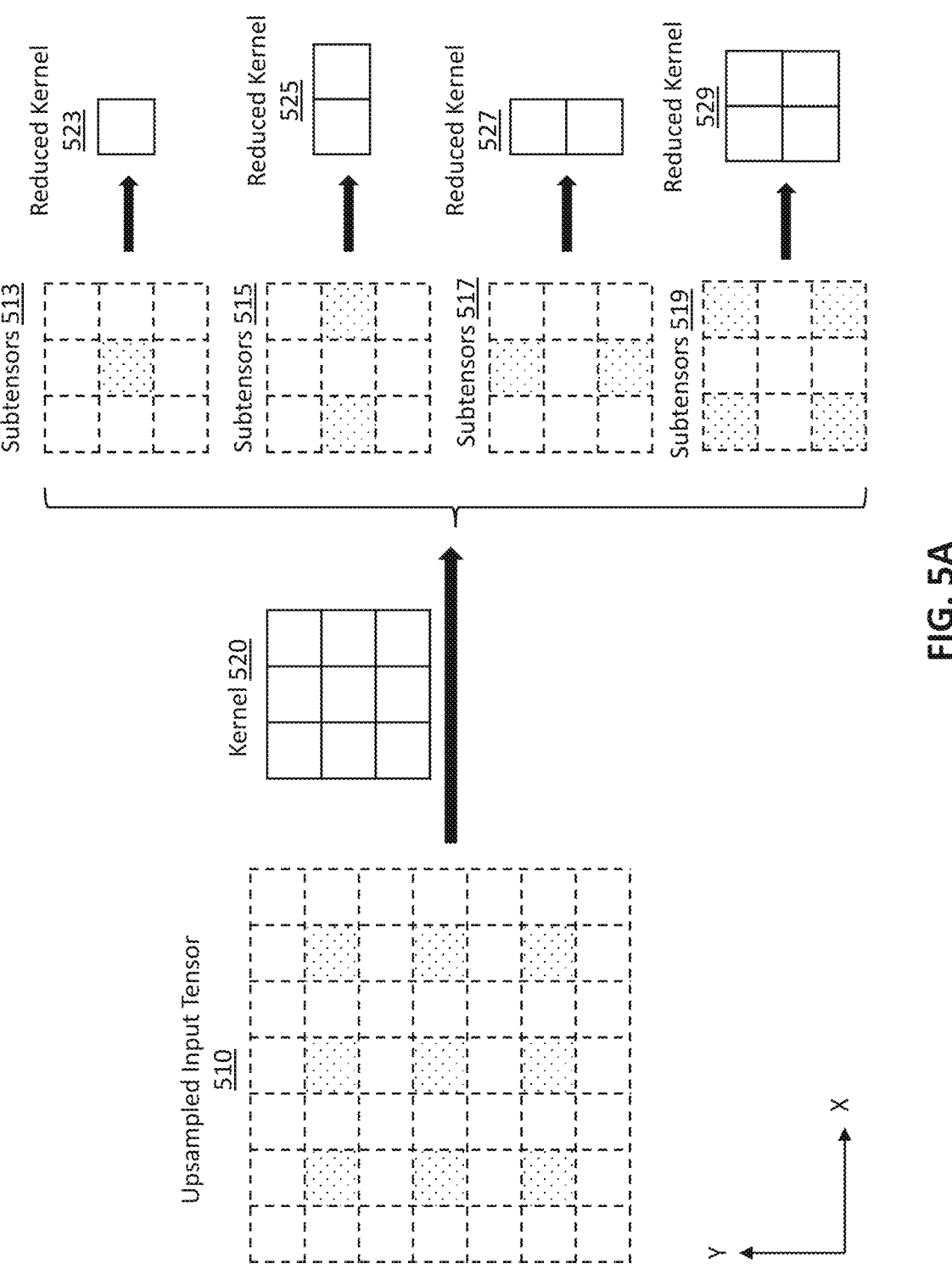
FIGS. 5A-5F illustrate an example deconvolution converted to multiple convolutions, in accordance with various embodiments, in accordance with various embodiments.

FIG. 5A shows an unsampled input tensor 510, which may be generated from an input tensor 505 by adding zeros into the input tensor, e.g., by using the process described in FIG. 2. The data points highlighted with a dotted pattern in the unsampled input tensor 510 are activations in the input tensor, the other data points in the unsampled input tensor 510 are zeros. For purpose of illustration, the input tensor has a size of 3×3, the unsampled input tensor 510 has a size of 7×7.

In FIG. 5A, the unsampled input tensor 510 are decomposed into subtensors 513, 515, 517, and 519. The unsampled input tensor 510 is decomposed based on the kernel 520. Each subtensor has the same size as the kernel. A subtensor decomposed from the unsampled input tensor 510 is an input operand for an MAC operation with the kernel, which produces an activation in the output tensor. Given the positions of the activations and zeros in the upsampled input tensor 510, the subtensors 513, 515, 517, and 519 have different activation distribution patterns and can be categorized into four groups. Each group is associated with a different activation distribution pattern. As shown in FIG. 5A, each of the subtensors 513 includes one activation positioned in the middle of the subtensor 513 and surrounded by zeros. Each of the subtensors 515 includes two input activations in the second row. Each of the subtensor 517 includes two input activations in the second column. Each of the subtensor 519 includes four input activations positioned at four corners of the subtensor 519. A group may include multiple subtensors having the same activation distribution pattern but different locations in the unsampled input tensor 510. Different groups may include different numbers of subtensors.

The kernel 520 are decomposed into reduced kernels 523, 525, 527, and 529 based on the subtensors 513, 515, 517, and 519. Each reduced kernel is smaller than the kernel 520 and includes a subset of the weights in the kernel 520. The weights in the reduced kernels 523, 525, 527, and 529 may be selected from the kernel 520 based on the activation distribution patterns in the subtensors 513, 515, 517, and 519. In some embodiments, a reduced kernel is generated based on each group of the subtensors 513, 515, 517, and 519. The weight(s) in a reduced kernel is selected based on the activation(s) in the corresponding subtensor. For the subtensors 513 which include one activation in the middle, the corresponding reduced kernel 523 includes one weight, which is the weight in the middle of the kernel 520 and may be denoted as (1,1) in the X-Y coordinate system. Similarly, the reduced kernel 525 corresponds to the subtensors 515 and includes two weights, which can be denoted as (0,1) and (2, 1). The reduced kernel 527 corresponds to the subtensors 517 and includes two weights, which can be denoted as (1,0) and (1,2). The reduced kernel 529 corresponds to the subtensors 519 and includes four weights, which can be denoted as (0,0), (0,2), (2,0), and (2,2). The reduced kernels 523, 525, 527, and 529 can be used for reduced convolutions.

Figure 5B:
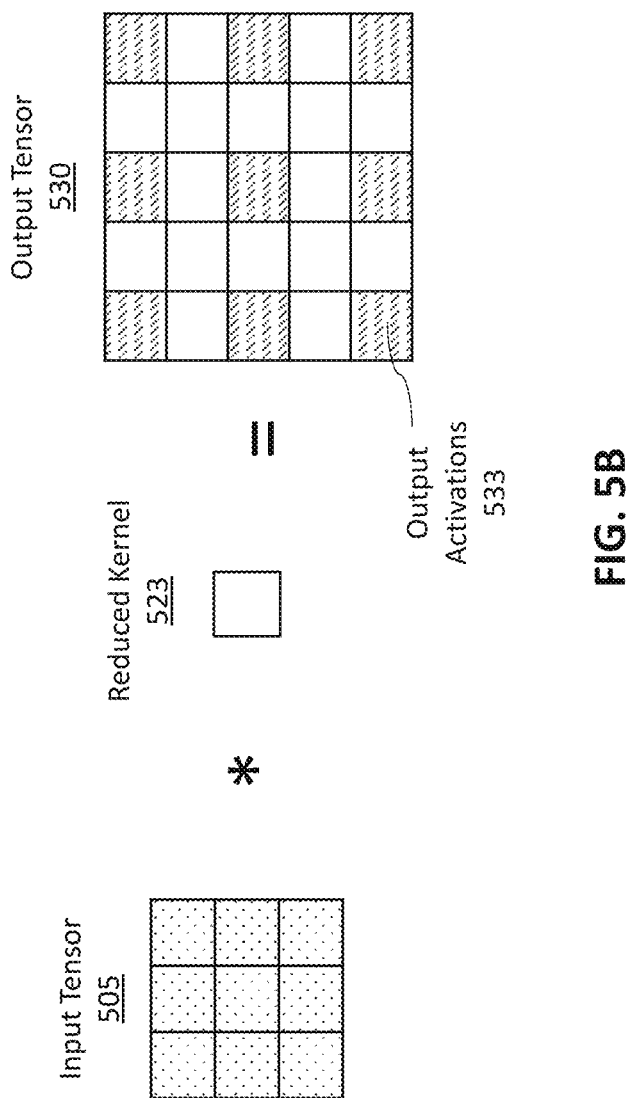

FIG. 5B illustrates a reduced convolution based on the input tensor 505 and the reduced kernel 523. The reduced kernel 523 slides across the input tensor 505 and produces nine output activations 533 (individually referred to as "output activation 533") in the output tensor 530 of the deconvolution. Each output activation 533 is a result of an MAC operation on the weight in the reduced kernel 523 with an input activation in the input tensor 505. The location of the nine output activations 533 in the output tensor 530 are determined based on locations of the subtensors 513, i.e., the subtensors based on which the reduced kernel 523 is generated, in the upsampled input tensor 510.

Figure 5C:
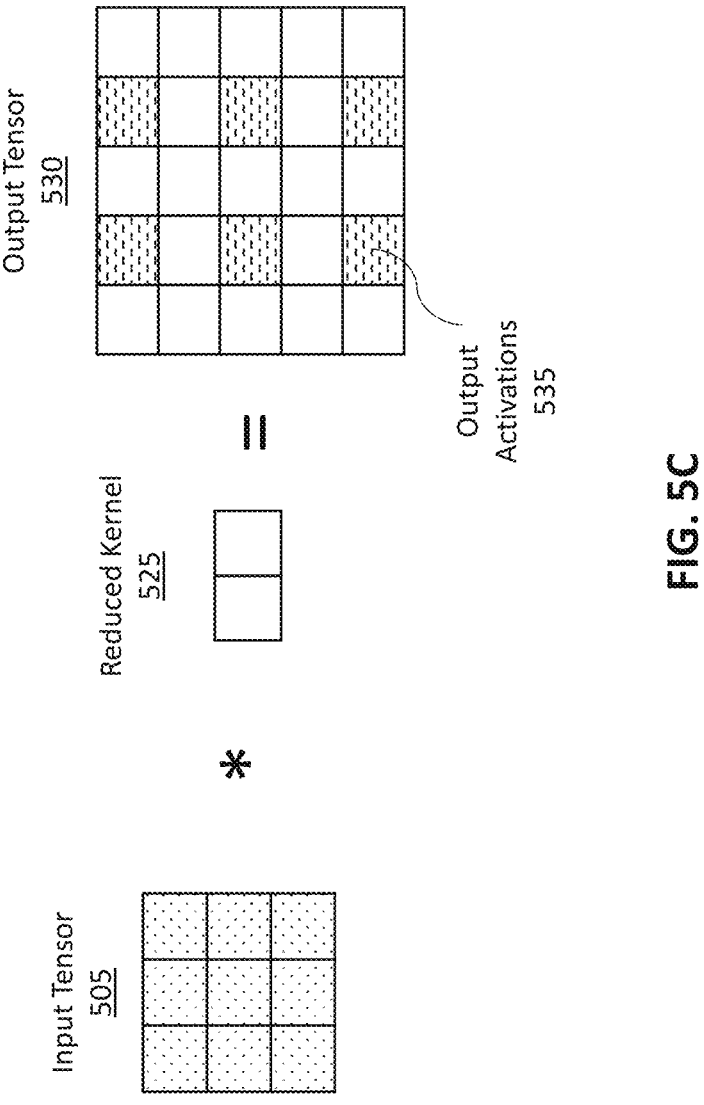

FIG. 5C illustrates another reduced convolution based on the input tensor 505 and the reduced kernel 525. The reduced kernel 525 slides across the input tensor 505 and produces six output activations 535 (individually referred to as "output activation 535") in the output tensor 530 of the deconvolution. Each output activation 535 is a result of an MAC operation on the weight in the reduced kernel 525 with two input activations in the input tensor 505. The location of the output activations 535 in the output tensor 530 are determined based on locations of the subtensors 515, i.e., the subtensors based on which the reduced kernel 525 is generated, in the upsampled input tensor 510.

Figure 5D:
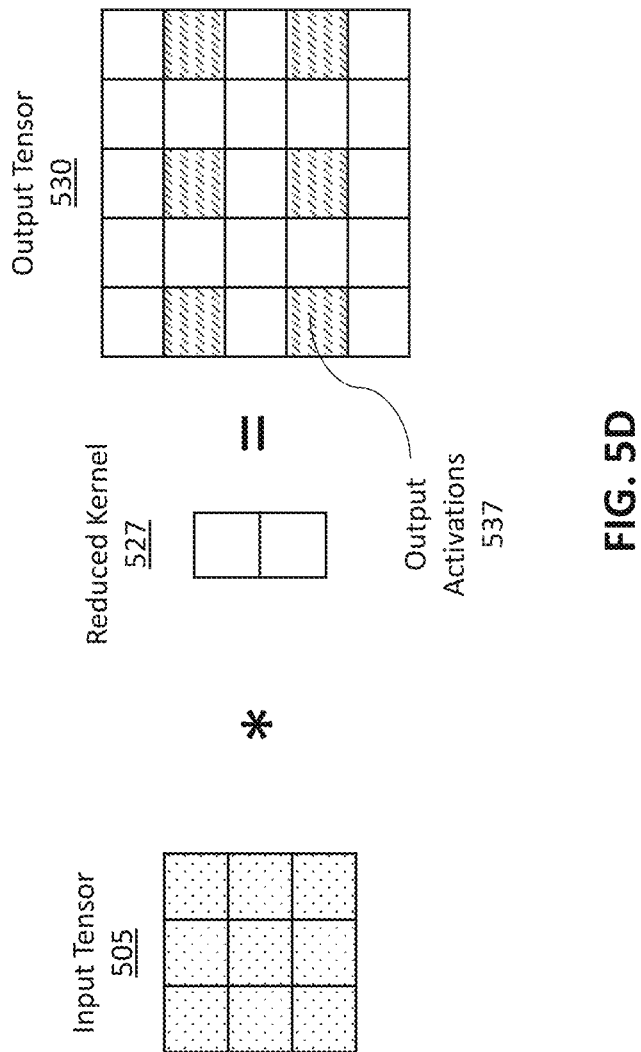

FIG. 5D illustrates another reduced convolution based on the input tensor 505 and the reduced kernel 527. The reduced kernel 527 slides across the input tensor 505 and produces six output activations 537 (individually referred to as "output activation 537") in the output tensor 530 of the deconvolution. Each output activation 537 is a result of an MAC operation on the weight in the reduced kernel 527 with two input activations in the input tensor 505. The location of the output activations 537 in the output tensor 530 are determined based on locations of the subtensors 515, i.e., the subtensors based on which the reduced kernel 527 is generated, in the upsampled input tensor 510.

Figure 5E:
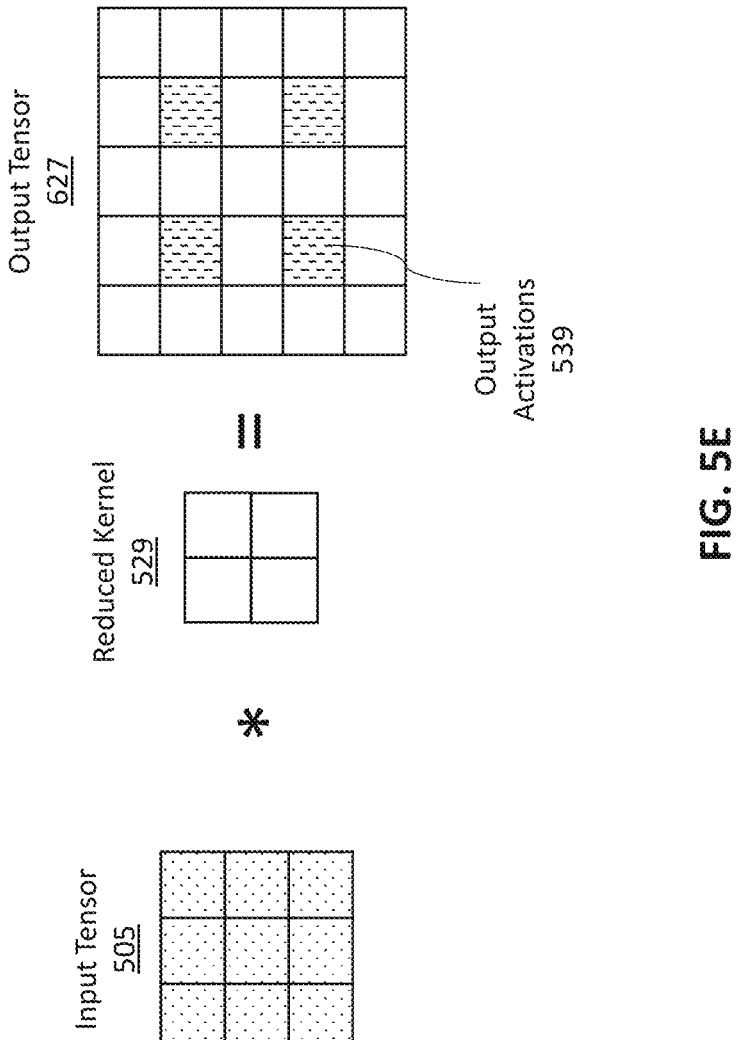

FIG. 5E illustrates another reduced convolution based on the input tensor 505 and the reduced kernel 529. The reduced kernel 529 slides across the input tensor 505 and produces four output activations 539 (individually referred to as "output activation 539") in the output tensor 530 of the deconvolution. Each output activation 539 is a result of an MAC operation on the weight in the reduced kernel 529 with four input activations in the input tensor 505. The location of the output activations 539 in the output tensor 530 are determined based on locations of the subtensors 515, i.e., the subtensors based on which the reduced kernel 529 is generated, in the upsampled input tensor 510.

Figure 5F:
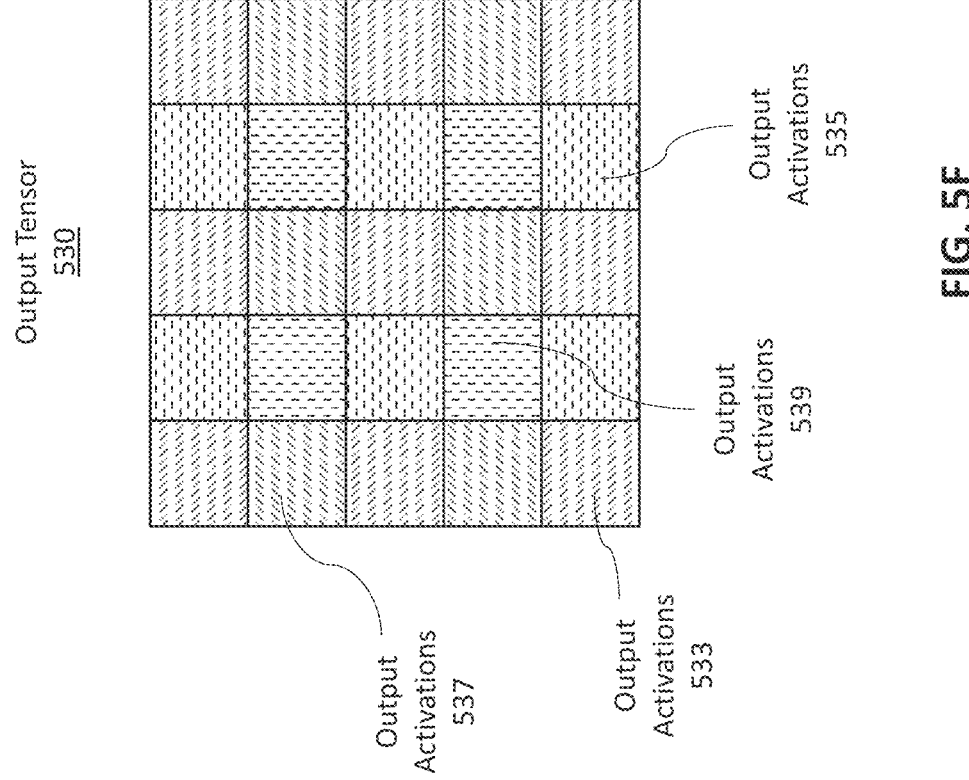

The output activations 533, 535, 537, and 539 may constitute all output activations in the output tensor 530. In FIG. 5F, the output activations 533, 535, 537, and 539 are interleaved to produce the output tensor 530. The output tensor 530 has a size of 5×5.

Figure 6:
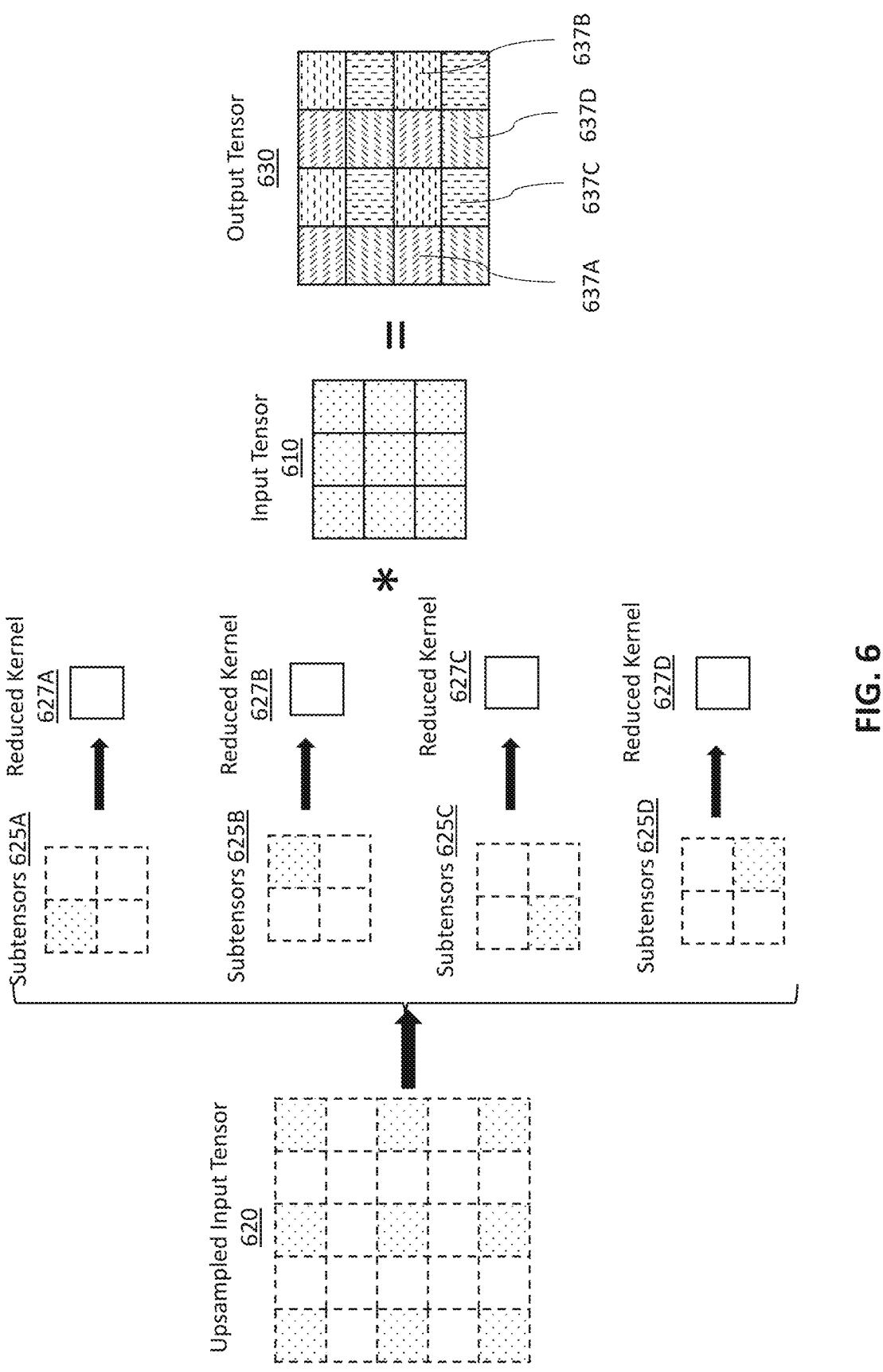
FIG. 6 illustrates another example deconvolution converted to multiple convolutions, in accordance with various embodiments, in accordance with various embodiments.

FIG. 6 illustrates another example deconvolution converted to multiple convolutions, in accordance with various embodiments, in accordance with various embodiments. Different from the deconvolution in FIGS. 5A-5F, the deconvolution in FIG. 6 a 2×2s2p1 deconvolution, i.e., the kernel size is 2×2, the stride size is 2, and the padding size is 1. The deconvolution has an input tensor 610 and an output tensor 630. The size of the input tensor 610 is 3×3. The size of the output tensor 630 is 4×4.

The input tensor 610 is expanded to produce an upsampled input tensor 620. As the kernel size is 2, the padding size is 1, the padding size for generating the upsampled input tensor 620 is 0. Thus, there is no zeros added to the edges of the input tensor 620. Zeros are added between adjacent activations of the input tensor 610. As the stride size is 2, one zero is added between every pair of adjacent activations. The upsampled input tensor 620 has a size of 5×5.

The upsampled input tensor 620 is decomposed into four categories of subtensors 625A-625D based on the kernel size. As shown in FIG. 6, the subtensors 625A-625D have the same size as the kernel, but have different activation distribution patterns. The subtensors 625A each have an activation in the first row and first column. The subtensors 625B each have an activation in the first row and second column. The subtensors 625C each have an activation in the second row and first column. The subtensors 625D each have an activation in the second row and second column. Reduced kernels 627A-627D are generated based on the subtensors 625A-625D. Each of the reduced kernels 627A-627D has one weight. The weight of the reduced kernel 627A may have a (X,Y) coordinate of (0,0) in the kernel. The weight of the reduced kernel 627B may have a (X,Y) coordinate of (1,0) in the kernel. The weight of the reduced kernel 627C may have a (X,Y) coordinate of (0,1) in the kernel. The weight of the reduced kernel 627D may have a (X,Y) coordinate of (1,1) in the kernel.

Further, the reduced kernels 627A-627D are applied on the input tensor 610 separately in separate reduced convolutions. Each reduced convolution produces six output elements in the output tensor 630. The reduced convolution with the reduced kernel 627A and the input tensor 610 produces six output activations 637A. The reduced convolution with the reduced kernel 627B and the input tensor 610 produces six output activations 637B. The reduced convolution with the reduced kernel 627C and the input tensor 610 produces six output activations 637C. The reduced convolution with the reduced kernel 627D and the input tensor 610 produces six output activations 637D. The output activations 637A-637D are interleaved in the output tensor 630. The positions of the output activations 637A-637D in the output tensor 630 are determined based on positions of the subtensors 625A-625D in the upsampled input tensor 620.

Figure 7A:
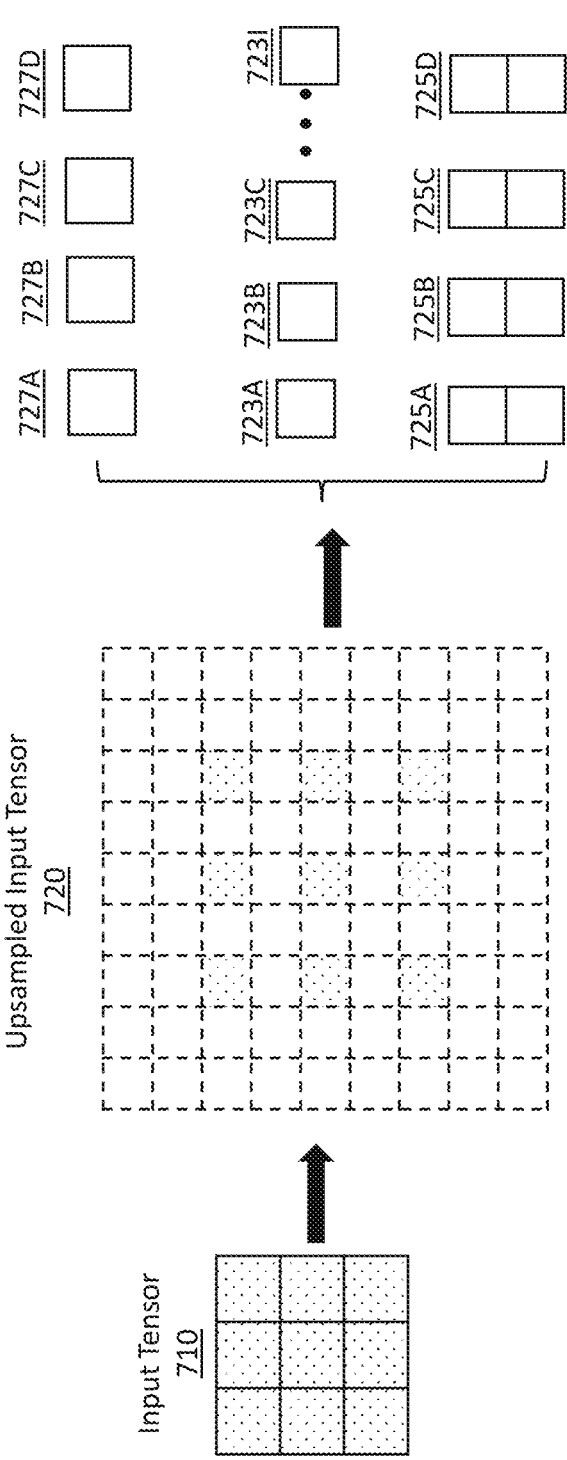
FIGS. 7A and 7B illustrates yet another example deconvolution converted to multiple convolutions, in accordance with various embodiments, in accordance with various embodiments.
Figure 7B:
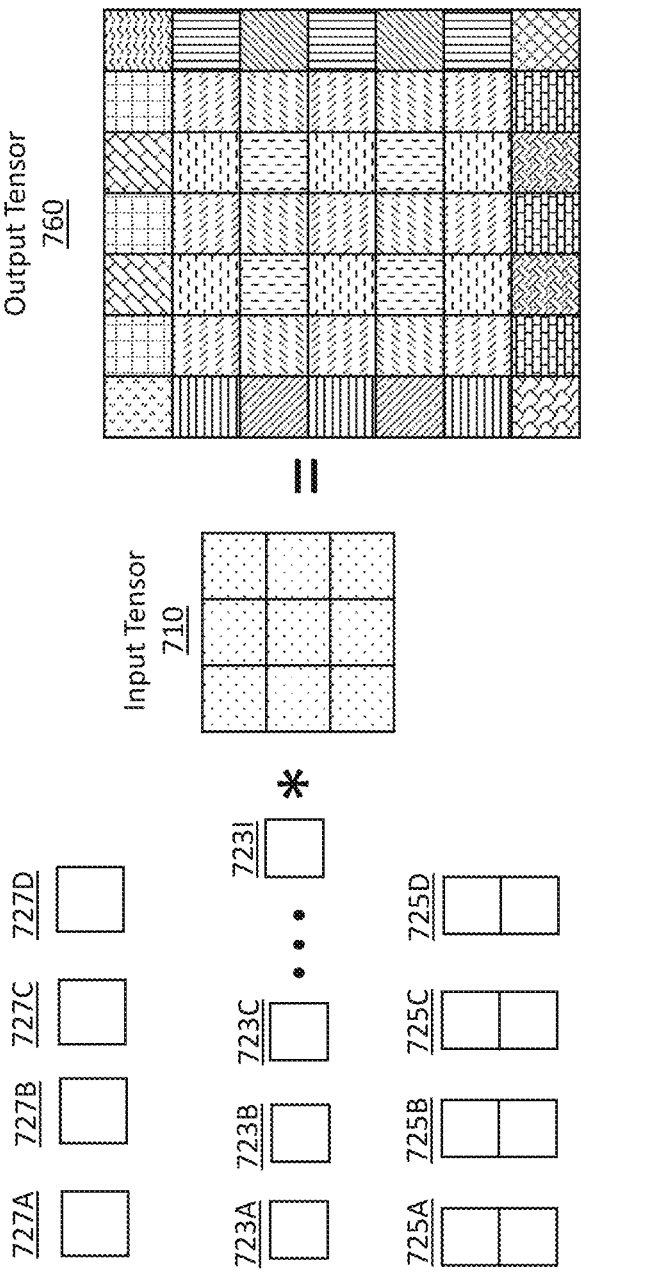

FIGS. 7A and 7B illustrates yet another example deconvolution converted to multiple convolutions, in accordance with various embodiments, in accordance with various embodiments. The deconvolution in FIG. 7 a 3×3s2p0 deconvolution, i.e., the kernel size is 3×3, the stride size is 2, and the padding size is 0. The deconvolution has a non-standard padding. The deconvolution has an input tensor 710 shown in FIG. 7A and an output tensor 760 shown in FIG. 7B. The size of the input tensor 710 is 3×3. The size of the output tensor 760 is 7×7.

The input tensor 710 is expanded to produce an upsampled input tensor 720. As the kernel size is 2, the padding size is 0, the padding size for generating the upsampled input tensor 720 is 2. Thus, two columns of zeros are added to the right edge of the input tensor 710, two columns of zeros are added to the left edge of the input tensor 710, two rows of zeros are added to the top edge of the input tensor 710, and two rows of zeros are added to the bottom edge of the input tensor 710. Additionally, zeros are added between adjacent activations of the input tensor 710. As the stride size is 2, one zero is added between every pair of adjacent activations. The upsampled input tensor 720 has a size of 9×9.

The upsampled input tensor 720 is decomposed into subtensors, based on which the kernel is decomposed into reduced kernels 723A-7231, 725A-725D, and 727A-727D. Given that the padding size of the deconvolution is 0, the zero-valued edges of the upsampled input tensor 720 are treated separately from the rest of the upsampled input tensor 720 in the decomposition process. For instance, the 5×5 tensor that includes the input activations may be extracted from the upsampled input tensor 720 and decomposed into the four reduced kernels 727A-727D. The 5×5 tensor includes all the input activations of the input tensor 710 and zeros inserted between the input activations but does not include the four columns of zeros added on the right and left edges or the four rows of zeros added on the top and bottom. The 5×5 tensor may be the same as the upsampled input tensor 620 in FIG. 6 and can be decomposed similarly as how the upsampled input tensor 620 is decomposed in FIG. 6. The reduced kernels 727A-727D are generated based on the decomposition of the 5×5 tensor. The reduced kernels 727A-727D may be the same as the reduced kernels 627A-627D in FIG. 6.

The reduced kernels 723A-7231 and 725A-725D are generated from decompositions of part of the upsampled input tensor 720, the part which includes the zero-valued edges. As shown in FIG. 6A, there are nine reduced kernels 723A-7231, each of which as one weight. There are also four reduced kernels 725A-725D, each of which has two weights. In FIG. 7A, each of the reduced kernels 725A-725D has a size of 1×2. In other embodiments, the reduced kernels 725A-725D may have a size of 2×1. In total, the decomposition of the upsampled input tensor 720 produces 17 reduced kernels 723A-7231, 725A-725D, and 727A-727D.

In FIG. 7B, each of the reduced kernels 723A-7231, 725A-725D, and 727A-727D is applied on the input tensor 170 to generate output activations in the output tensor 730. Each output activation is produced from a separate reduced convolution. As there are 17 reduced kernels 723A-7231, 725A-725D, and 727A-727D, there can be 17 separate reduced convolutions. The output activations produced from different reduced convolutions are highlighted with different patterns in FIG. 7B.

Example Deconvolution System

Figure 8:
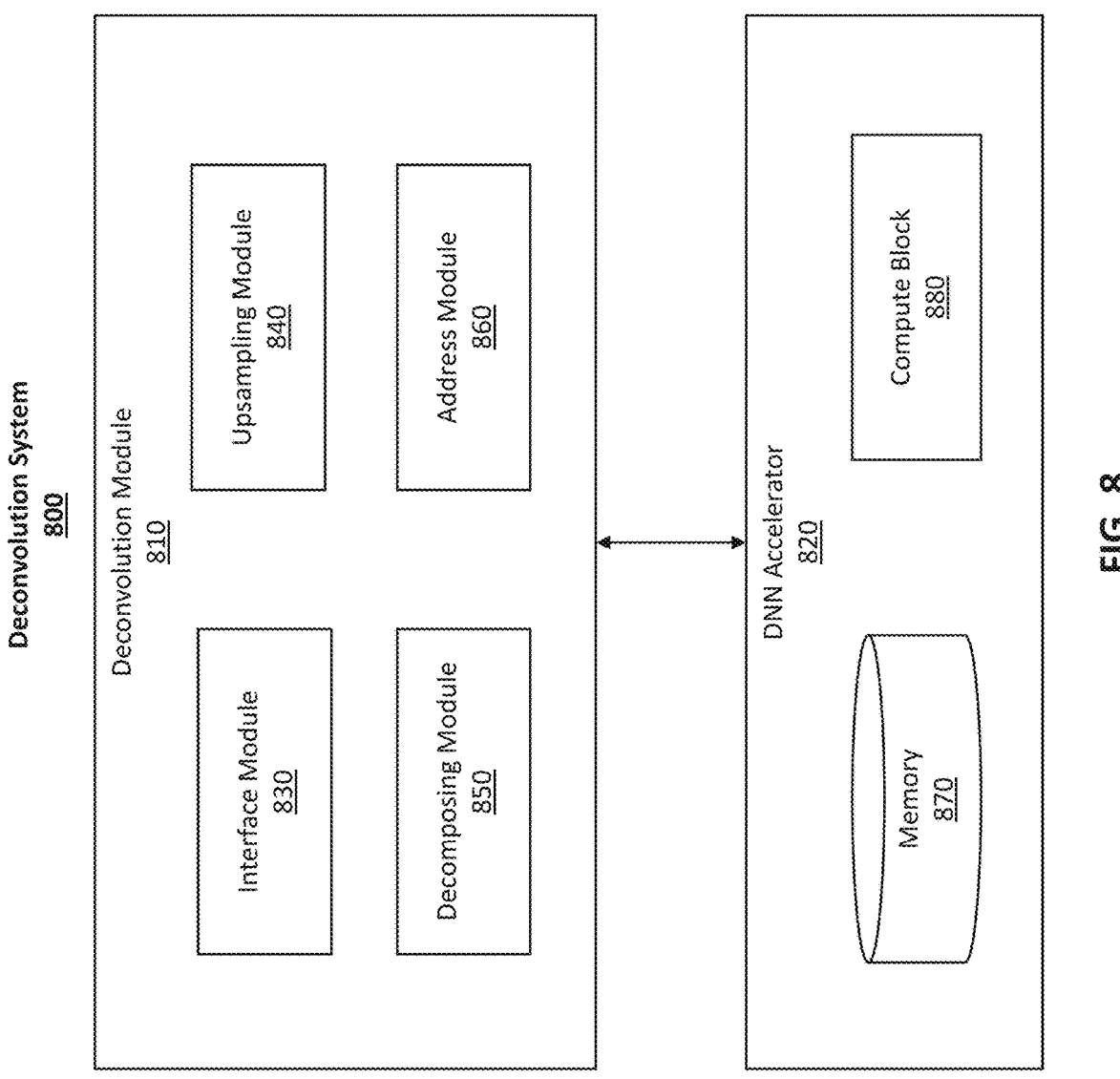
FIG. 8 illustrates a deconvolution system, in accordance with various embodiments.

FIG. 8 illustrates a deconvolution system 800, in accordance with various embodiments. The deconvolution system 800 can decompose a deconvolution into multiple convolutions and executing the multiple convolutions to produce an output tensor of the deconvolution. The deconvolution system 800 can facilitate execution of the deconvolution with a DNN accelerator designed for executing convolutions with optimized efficiency. The deconvolution system 800 includes a deconvolution module 810 and a DNN accelerator 820. The deconvolution module 810 decomposes a deconvolution into multiple convolutions. Each of the convolution is to be performed with the input tensor of the deconvolution and a reduced kernel including a subset of weights in the kernel of the deconvolution. The convolutions are also referred to as reduced convolutions. The DNN accelerator 820 receives the input tensor and reduced kernels from the deconvolution module 810 and executes the reduced convolutions to produce the output tensor of the deconvolution. In some embodiments, the deconvolution module 810 may be at least partially implemented in software, and the DNN accelerator 820 may be at least partially implemented in hardware. The decomposition of the deconvolution by the deconvolution module 810 may be in the offline network compilation stage, and the execution of the reduced convolutions by the DNN accelerator 820 may be in the online network execution stage.

In other embodiments, alternative configurations, different or additional components may be included in the deconvolution system 800. For instance, the deconvolution system 800 may include a communication channel to facilitate communications between the deconvolution module 810 and the DNN accelerator 820. Further, functionality attributed to a component of the deconvolution system 800 may be accomplished by a different component included in the deconvolution system 800 or by a different system.

The deconvolution module 810 includes an interface module 830, an upsampling module 840, a decomposing module 850, and an address module 860. The interface module 830 facilitates communications of the deconvolution module 810 with the DNN accelerator 820 or other systems. For example, the interface module 830 may receive data associated with a deconvolution, such as the input tensor, kernel, padding information (e.g., padding size), stride information (e.g., stride size), or other information of the deconvolution. The interface module 830 may also provide data generated by the decomposing module 850 or the address module 860 to the DNN accelerator 820.

The upsampling module 840 generates an upsampled input tensor from the input tensor. In some embodiments, the upsampling module 840 adds zeros into the input tensor based on the kernel size and padding size of the deconvolution. The upsampling module 840 may add zeros to the edges of the input tensor based on a padding size p. The upsampling module 840 may determine the padding size p based on the following formula:

$$p = k_{deconv} - p_{deconv} - 1$$

where $k_{deconv}$ denotes the kernel size of the deconvolution, $p_{deconv}$ denotes the padding size of the deconvolution. In this formula, p or $p_{deconv}$ is a single number, which indicates the number of row(s) or columns(s) to be added to each edge of the input tensor. Also, $k_{deconv}$ is a single number, assuming the number of rows and the number of columns in the kernel are the same. In an example where p=1, one column of zero values is added to the right of the input tensor, one column of zero values is added to the left of the input tensor, one row of zero values is added to the top of the input tensor, and one row of zero values is added to the bottom of the input tensor. Thus, for an input sensor having a size of H×W, the padding changes the size of the tensor to (H+2)×(W+2). In other embodiments, different numbers of rows or columns may be added to different edges of the input tensor.

The upsampling module 840 also insert zeros between activations in the input tensor, e.g., based on the stride size of the convolution. In some embodiments, the upsampling module 840 may determine an insertion factor that indicates the number of zeros to be inserted between two adjacent activations in the input tensor. The insertion factor may equal the stride size minus 1. In an example where the stride size is 2, the insertion factor is 1 and one zero is inserted between two adjacent activations. The resulting tensor will be larger than (H+2)×(W+2).

After the zeros are added to the edges of the input tensor and between the activations, the upsampled input tensor is produced. The upsampled input tensor has a larger size than the input tensor and output tensor of the deconvolution. The size of the upsampled input tensor may vary depending on the size of the input tensor, the size of the kernel, the stride size, and the padding size of the deconvolution. Examples of the upsampled input tensor include the upsampled input tensors 320, 620, and 720 shown in FIGS. 3, 6, and 7, respectively. The upsampled input tensor may not be used for MAC operations by the DNN accelerator. Rather, the upsampled input tensor may be provided to the decomposing module 850 for decomposing the deconvolution into the reduced convolutions.

The decomposing module 850 generates reduced kernels from the kernel of the deconvolution based on the upsampled input tensor generate by the upsampling module 840. In some embodiments, the decomposing module 850 may decompose the upsampled input tensor into a plurality of subtensors. Each subtensor is a portion of the upsampled input tensor and has a size that is the same as the kernel size. A subtensor may include one or more zeros added to the input tensor and one or more activations in the input tensor. The decomposing module 850 may also classifies the subtensors into groups based on activation distribution patterns in the subtensors. An activation distribution pattern of a subtensor is a layout pattern of activation(s) and zero(s) in the subtensor. The subtensors in the same group may have the same activation distribution pattern. For instance, the subtensors have the same number of activations and the activation(s) have the same position(s).

The decomposing module 850 generates a reduced kernel based on the activation distribution pattern of a group of subtensors. For instance, the decomposing module 850 determines positions of activation(s) in the activation distribution pattern. For each activation in the activation distribution pattern, the decomposing module 850 selects a corresponding weight from the kernel. The position of the weight in the kernel may be the same as the position of the activation in the activation distribution pattern. The decomposing module 850 can generate a reduced kernel that includes weight(s) corresponding to the activation(s) in the subtensor. As the subtensor also includes zeros, the reduced kernel may not have all the weights in the kernel and therefore, may have a smaller size than the kernel. The decomposing module 850 can generate a plurality of reduced kernels, each of which corresponds to a different group of subtensors. The decomposing module 850 may provide the reduced kernels to the DNN accelerator 820, e.g., through the interface module 830, for executing reduced convolutions.

The address module 860 determines addresses ("memory address") of input activations and output activations for facilitating the execution of the reduced convolutions. The addresses of the input activations may be used by the DNN accelerator 820 to read the correct input activations from the memory for performing the reduced convolutions. As the reduced kernels may be different (e.g., include different number of weights, have different sizes, etc.), the input operands of different reduced convolutions are different. The positions of the output activations may be used by the DNN accelerator 820 to write output activations produced from the reduced convolutions into correct locations in the memory. The output activations produced by different reduced convolutions have different positions in the output tensor. The DNN accelerator 820 may need to read (or write) with strides independently in the X- and Y-dimensions of the input tensor (or the output tensor).

In some embodiments, the address module 860 may use the following formula to determine positions of activations (input activations or output activations):

$$addr[x_{idx}, y_{idx}, z_{idx}] = base_{addr} + Sx^*(x_{idx} - x_0) + Sy^*(y_{idx} - y_0) + Sz^*(z_{idx} - z_0)$$

where $base_{addr}$ is the base address of the tensor (either input tensor or output tensor), Sx, Sy, Sz are strides of the tensor and are the number of locations in memory between beginnings of successive array elements. $x_{idx}$, $y_{idx}$, and $z_{idx}$ are the tensor coordinates in a X-Y-Z coordinate system. $x_0$, $y_0$, and $z_0$ are the offset of the first element of the input slice.

In an example of the 2×2s2p1 deconvolution in FIG. 6, for the reduced convolution with the reduced kernel 627A, an example input slide may have the following addresses:

$x_0, y_0, z_0 = 0$
Sx=C
Sy=3*C
$x_{idx} \in [0,1]$
$y_{idx} \in [0,1]$ where C is the number of channels in the input tensor. The output activations produced from the reduced convolution may have the following addresses:

$x_0, y_0, z_0 = 0$
Sx=2*K
Sy=8*K
$x_{idx} \in [0,1]$
$y_{idx} \in [0,1]$ where K is the kernel size.

As another example, for the reduced convolution with the reduced kernel 627D, an example input slide may have the following addresses:

$x_0, y_0, z_0 = 4*C$
Sx=C
Sy=3*C $x_{idx} \in [0,1]$
$y_{idx} \in [0,1]$

The output activations produced from the reduced convolution may have the following addresses:

$x_0, y_0, z_0 = 6*K$
$Sx = 2*K$
$Sy = 9*K$
$x_{idx} \in [0,1]$
$y_{idx} \in [0,1]$ The DNN accelerator 820 executes the reduced convolutions generated from the deconvolution based on information received from the deconvolution module 810. The DNN accelerator 820 includes a memory 870 and a compute block 880. The memory 870 stores data used for or generated by the reduced convolutions. For instance, the memory 870 stores the input tensor and reduced kernels. The memory 870 may also store the output tensor generated from the reduced convolutions. In some embodiments, the output activations in the output tensor are stored at addresses determined by the address module 860.

The compute block 880 can perform MAC operations to execute the reduced convolutions. The compute block 880 may receive information or instruction from the deconvolution module 810. For instance, the compute block 880 may receive addresses of input activations from the deconvolution module 810 and read the input activations from the memory based on the addresses. The compute block 880 may also read reduced kernels from the memory. The compute block 880 may then perform MAC operations on the input activations and reduced kernels. From each reduced convolution, the compute block 880 may produce one or more output activations. The compute block 880 can write the output activations into the memory based on addresses provided by the address module 860. The output activations from different reduced convolutions may be interleaved.

In some embodiments, the compute block 880 includes a PE array to perform the MAC operations. An example of the PE array is the PE array 900 in FIG. 9. The compute block 880 may be a compute tile. The DNN accelerator 820 may include multiple compute tiles arranged in parallel. The reduced convolutions may be performed by one or more of the compute tiles.

Example PE Array

Figure 9A:
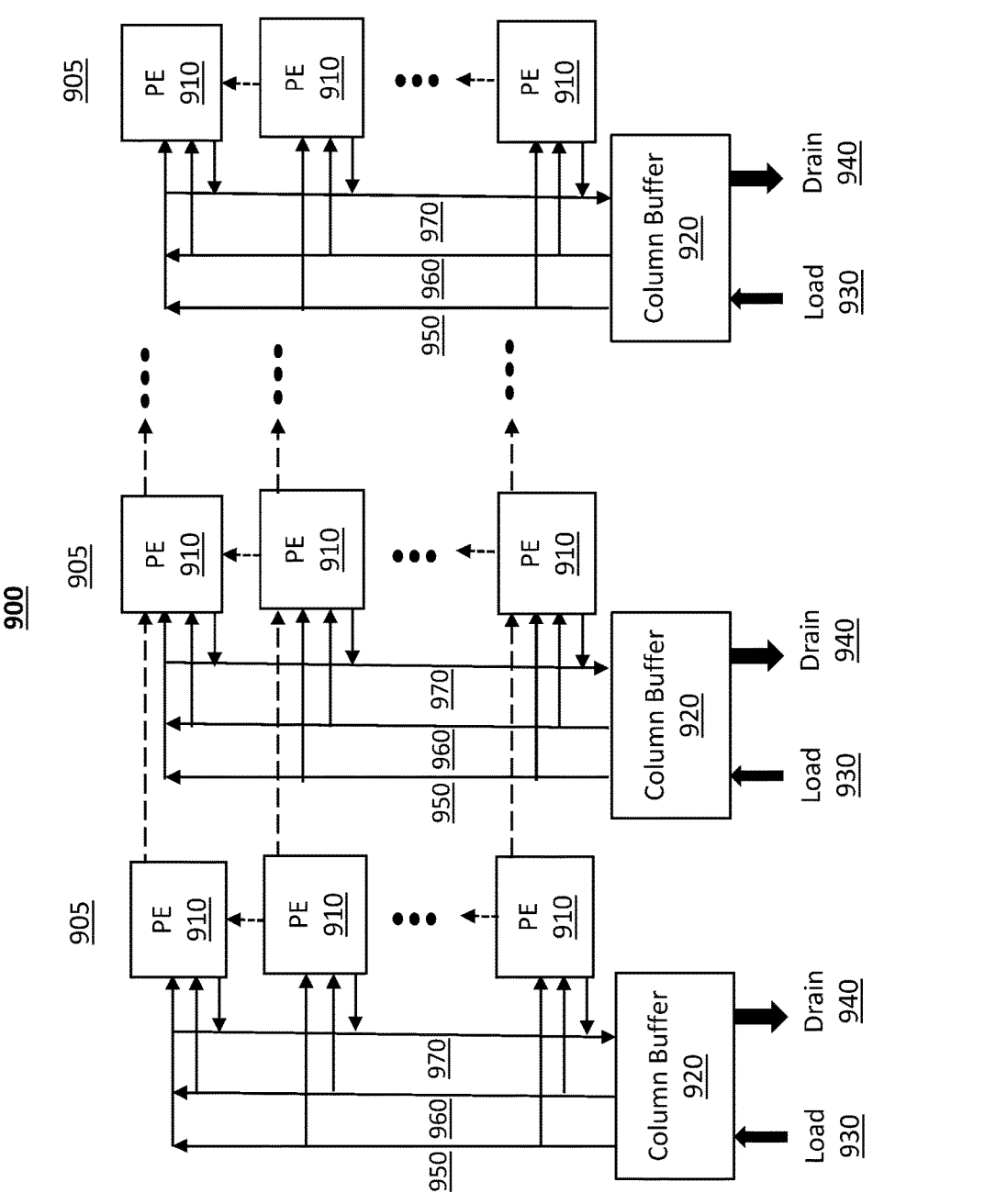
FIG. 9A illustrates an example processing element (PE) array, in accordance with various embodiments.

FIG. 9A illustrates a PE array 900, in accordance with various embodiments. The PE array 900 may be at least part of the compute block 880 in FIG. 8. The PE array 900 includes a plurality of PEs 910 (individually referred to as "PE 910"). The PEs 910 perform MAC operations, such as integer MAC operations, floating-point MAC operations, and so on. The PEs 910 may also be referred to as neurons or nodes in the DNN. Each PE 910 has 2 input signals 950 and 960 and an output signal 970. The input signal 950 is at least a portion of an input tensor or an upsampled input tensor. The input signal 950 may be an input operand. The input signal 960 may be a kernel or a reduced kernel. In some embodiments, the input signal 950 of a PE 910 includes one or more input operands, and the input signal 960 includes one or more weight operands.

Each PE 910 may perform an MAC operation on the input signals 950 and 960 and outputs the output signal 970, which is a result of the MAC operation. Some or all of the input signals 950 and 960 and the output signal 970 may be in an integer format, such as INT8, or floating-point format, such as FP16 or BF16. For purpose of simplicity and illustration, the input signals and output signal of all the PEs 910 have the same reference numbers, but the PEs 910 may receive different input signals and output different output signals from each other. Also, a PE 910 may be different from another PE 910, e.g., including more, fewer, or different components.

As shown in FIG. 9, the PEs 910 are connected to each other, as indicated by the dash arrows in FIG. 9. The output signal 970 of an PE 910 may be sent to many other PEs 910 (and possibly back to itself) as input signals via the interconnections between PEs 910. In some embodiments, the output signal 970 of an PE 910 may incorporate the output signals of one or more other PEs 910 through an accumulate operation of the PE 910 and generates an internal partial sum of the PE array. Certain aspects of the PEs 910 are described below in conjunction with FIG. 9.

In the embodiments of FIG. 9, the PEs 910 are arranged into columns 905 (individually referred to as "column 905" or "PE column 905"). The input and weights of the layer may be distributed to the PEs 910 based on the columns 905. Each column 905 has a column buffer 920. The column buffer 920 stores data provided to the PEs 910 in the column 905 for a short amount of time. The column buffer 920 may also store data output by the last PE 910 in the column 905. The output of the last PE 910 may be a sum of the MAC operations of all the PEs 910 in the column 905, which is a column-level internal partial sum of the PE array 900. In other embodiments, input and weights may be distributed to the PEs 910 based on rows in the PE array 900. The PE array 900 may include row buffers in lieu of column buffers 920. A row buffer may store input signals of the PEs in the corresponding row and may also store a row-level internal partial sum of the PE array 900.

As shown in FIG. 9, each column buffer 920 is associated with a load 930 and a drain 940. The data provided to the column 905 is transmitted to the column buffer 920 through the load 930, e.g., through upper memory hierarchies, e.g., the memory 870 in FIG. 8. The data generated by the column 905 is extracted from the column buffers 920 through the drain 940. In some embodiments, data extracted from a column buffer 920 is sent to upper memory hierarchies, e.g., the memory 870 in FIG. 8, through the drain operation. In some embodiments, the drain operation does not start until all the PEs 910 in the column 905 has finished their MAC operations.

Figure 9B:
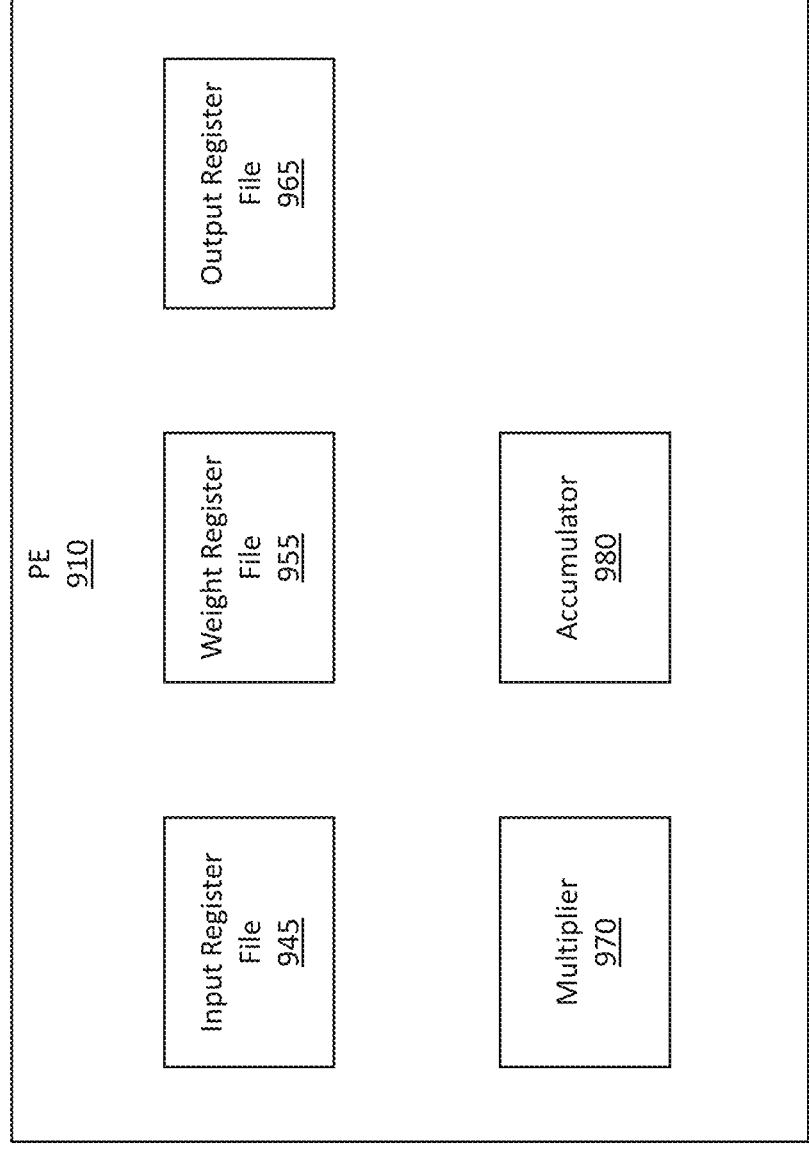
FIG. 9B is a block diagram of a PE, in accordance with various embodiments.

FIG. 9B is a block diagram of a PE 910, in accordance with various embodiments. The PE 910 in FIG. 10 includes an input register file 945, a weight register file 955, an output register file 965, and a MAC unit 970. In other embodiments, the PE 910 may include fewer, more, or different components. For instance, the PE 910 may include multiple MAC units 970. In some embodiments, the input register file 945, weight register file 955, or output register file 965 may be at least part of the memory 240.

The input register file 945 temporarily stores input signals (e.g., contexts) received by the PE 910. The input feature data may include input feature data and output signals from other PEs 910. The weight register file 955 temporarily stores weights received by the PE 910. The output register file 965 temporarily stores output signals generated by the PE 910. For purpose of illustration and simplicity, the PE 910 in FIG. 9B includes one input register file 945, one weight register file 955, one output register file 965. In other embodiments, a PE 910 may include multiple register files for each type of data. In some embodiments, the input register file 945, weight register file 955, and output register file 965 are part of the memory 240. The MAC unit 970 performs MAC operations on data in the input register file 945 and weight register file 955. The MAC unit 970 includes a multiplier 970 and an accumulator 980. The multiplier 970 performs multiply operations on input feature data in the input register file 945 and weights in the weight register file 955. The amount of time needed by the multiplier 970 for a multiple operation depends on the sparsity level of the weights used in the multiple operation. If the weights are denser (i.e., the sparsity level is lower), the multiplier 970 needs more time to perform the multiple operation. The accumulator 980 performs accumulate operations on the output of the multiplier 970 and outputs signals from other PEs. The output of the accumulator 980 is the output signal of the PE 910.

Example Methods of Deconvolution

FIG. 10 is a flowchart showing a method 1000 of decomposing a deconvolution into multiple convolutions, in accordance with various embodiments. The method 1000 may be performed by the deconvolution module 810 in FIG. 8. Although the method 1000 is described with reference to the flowchart illustrated in FIG. 10, many other methods decomposing a deconvolution may alternatively be used. For example, the order of execution of the steps in FIG. 10 may be changed. As another example, some of the steps may be changed, eliminated, or combined.

The deconvolution module 810 generates 1010 an upsampled input tensor by adding new input activations into an input tensor of a transposed convolution. The input tensor comprises a plurality of input activations. The new input activations have values of zero. In some embodiments, the deconvolution module 810 may determine a padding size for the upsampled input tensor based on a size of the kernel and a padding size of the deconvolution. The deconvolution module 810 may add at least some of the new input activations to edges of the input tensor based on the padding size. The deconvolution module 810 may also insert some other ones of the new input activations between adjacent input activations of the plurality of input activations based on a stride size of the deconvolution. A size of the plurality of subtensors may be the same as a size of the kernel.

The deconvolution module 810 identifies 1020 a plurality of subtensors from the upsampled input tensor. The deconvolution module 810 determines 1030 distributions of the plurality of input activations in the plurality of subtensors. In some embodiments, the deconvolution module 810 classifies the plurality of subtensors into a plurality of groups. A group comprises a subset of the plurality of subtensors. Subtensors in the subset may have an activation distribution pattern. The activation distribution pattern indicates one or more positions of one or more input activations in each of the subtensors in the subset. The deconvolution module 810 also generates a reduced kernel of the plurality of reduced kernels based on the activation distribution pattern. The reduced kernel and the input tensor may be used for a reduced convolution. The reduced convolution produces output activations of the output tensor. Positions of the output activations in the output tensor are determined based on positions of the subtensors in the subset in the upsampled input tensor.

In some embodiments, the deconvolution module 810 identifies one or more weights from the kernel based on the one or more positions of one or more input activations in each of the subtensors in the subset. One or more positions of the one or more weights in the kernel are the same as the one or more positions of one or more input activations in each of the subtensors. The deconvolution module 810 includes the one or more weights in the reduced kernel.

The deconvolution module 810 decomposes 1040 a kernel of the transposed convolution into a plurality of reduced kernels based on the distributions. The kernel comprises a plurality of weights. Each reduced kernel comprises a subset of the plurality of weights. The plurality of reduced kernels and the input tensor are used to produce an output tensor of the transposed convolution. In some embodiments, the plurality of reduced kernels comprises a first reduced kernel and a second reduced kernel, and the first reduced kernel and the second reduced kernel have different sizes.

In some embodiments, the output tensor comprises a plurality of output activations, and a reduced kernel of the plurality of reduced kernels is to be used to produce one or more output activations of the plurality of output activations. In some embodiments, the output tensor comprises a first output activation produced by using a first reduced kernel of the plurality of reduced kernels. The output tensor further comprises second output activations produced by a second reduced kernel of the plurality of reduced kernels. The first output activation is arranged between the second output activations in the output tensor.

FIG. 11 is a flowchart showing a method 1100 of performing a deconvolution, in accordance with various embodiments. The method 1100 may be performed by the compute block 880 in FIG. 8. Although the method 1100 is described with reference to the flowchart illustrated in FIG. 11, many other methods for performing a deconvolution may alternatively be used. For example, the order of execution of the steps in FIG. 11 may be changed. As another example, some of the steps may be changed, eliminated, or combined.

The compute block 880 receives 1110 a plurality of reduced kernels that is generated by decomposing a kernel of a deconvolution, wherein the kernel comprises a plurality of weights, and each reduced kernel comprises a subset of the plurality of weights. In some embodiments, the kernel is decomposed by generating an upsampled input tensor by adding new input activations into the input tensor. The new input activations have values of zero. The kernel is decomposed further by decomposing the kernel based on distributions of the plurality the input activations in the upsampled input tensor. A padding size may be determined based on a size of the kernel and a padding size of the deconvolution. The new input activations may be added into the input tensor based on the padding size. In some embodiments, the upsampled input tensor has a size that is larger than the size of the output tensor.

In some embodiments, the kernel may be decomposed further based on a size of the kernel. A plurality of subtensors may be identified from the upsampled input tensor. Each subtensor has a size same as the size of the kernel. The plurality of subtensors is classified into a plurality of groups. A group comprises a subset of the plurality of subtensors. Subtensors in the subset have a same distribution pattern of one or more input activations. A reduced kernel of the plurality of reduced kernels may be generated based on the same distribution pattern.

In some embodiments, the plurality of reduced kernels comprises a first reduced kernel and a second reduced kernel. The number of weights in the first reduced kernel may be different from the number of weights in the second reduced kernel. The first reduced kernel may comprise one or more weights arranged in a first matrix, the second reduced kernel may comprise one or more other weights arranged in a second matrix. The first matrix may have a different shape form the second matrix.

The compute block 880 receives 1120 an input tensor of the deconvolution. The input tensor comprises a plurality of input activations. The input tensor has a size determined by a number of input activations in a row or column in the input tensor.

The compute block 880 performs 1130 a plurality of convolutions with the input tensor and the plurality of reduced kernels. Each respective convolution of the plurality of convolutions is performed on the input tensor and a different one of the plurality of reduced kernels.

The compute block 880 generates 1140 an output tensor of the deconvolution, wherein the output tensor comprises a plurality of output activations produced from the plurality of convolutions, the output tensor has a size determined by a number of output activations in a row or column in the output tensor. The output tensor may be generated by determining positions of the plurality of output activations in the output tensor based on a stride size of the deconvolution. In some embodiments, the output tensor comprises a first output activation produced by a first convolution of the plurality of convolutions. The output tensor further comprises second output activations produced by a second convolution of the plurality of convolutions. The first output activation is arranged between the second output activations in the output tensor.

Example Deep Learning Environment

Figure 12:
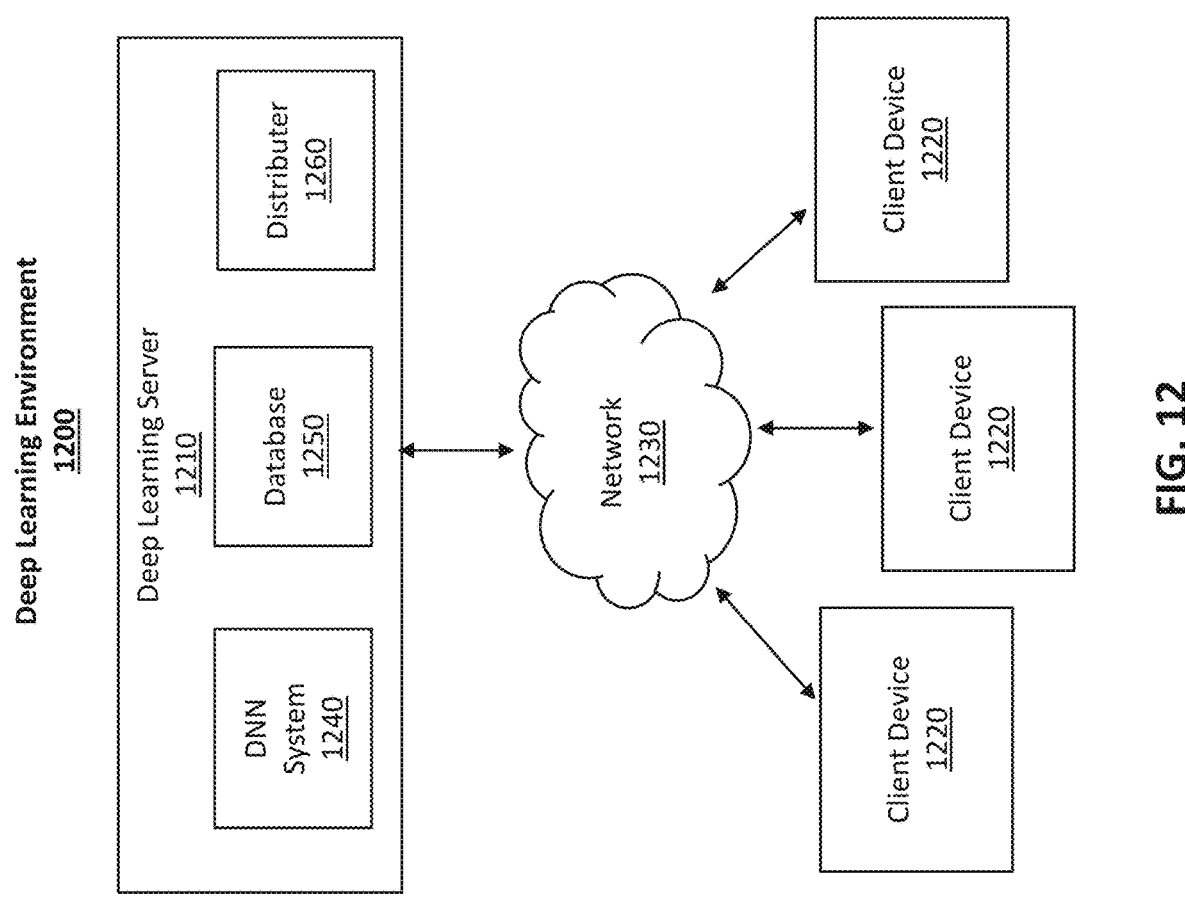
FIG. 12 illustrates a deep learning environment, in accordance with various embodiments.

FIG. 12 illustrates a deep learning environment 1200, in accordance with various embodiments. The deep learning environment 1200 includes a deep learning server 1210 and a plurality of client devices 1220 (individually referred to as client device 1220). The deep learning server 1210 is connected to the client devices 1220 through a network 1230. In other embodiments, the deep learning environment 1200 may include fewer, more, or different components.

The deep learning server 1210 trains deep learning models using neural networks. A neural network is structured like the human brain and consists of artificial neurons, also known as nodes. These nodes are stacked next to each other in 3 types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The deep learning server 1210 can use various types of neural networks, such as DNN, recurrent neural network (RNN), generative adversarial network (GAN), long short-term memory network (LSTMN), and so on. During the process of training the deep learning models, the neural networks use unknown elements in the input distribution to extract features, group objects, and discover useful data patterns. The deep learning models can be used to solve various problems, e.g., making predictions, classifying images, and so on. The deep learning server 1210 may build deep learning models specific to particular types of problems that need to be solved. A deep learning model is trained to receive an input and outputs the solution to the particular problem.

In FIG. 12, the deep learning server 1210 includes a DNN system 1240, a database 1250, and a distributer 1260. The DNN system 1240 trains DNNs. The DNNs can be used to process images, e.g., images captured by autonomous vehicles, medical devices, satellites, and so on. In an embodiment, a DNN receives an input image and outputs classifications of objects in the input image. An example of the DNNs is the DNN 100 described above in conjunction with FIG. 1. In some embodiments, the DNN system 1240 trains DNNs through knowledge distillation, e.g., dense-connection based knowledge distillation. The trained DNNs may be used on low memory systems, like mobile phones, IOT edge devices, and so on.

The database 1250 stores data received, used, generated, or otherwise associated with the deep learning server 1210. For example, the database 1250 stores a training dataset that the DNN system 1240 uses to train DNNs. In an embodiment, the training dataset is an image gallery that can be used to train a DNN for classifying images. The training dataset may include data received from the client devices 1220. As another example, the database 1250 stores hyper-parameters of the neural networks built by the deep learning server 1210.

The distributer 1260 distributes deep learning models generated by the deep learning server 1210 to the client devices 1220. In some embodiments, the distributer 1260 receives a request for a DNN from a client device 1220 through the network 1230. The request may include a description of a problem that the client device 1220 needs to solve. The request may also include information of the client device 1220, such as information describing available computing resource on the client device. The information describing available computing resource on the client device 1220 can be information indicating network bandwidth, information indicating available memory size, information indicating processing power of the client device 1220, and so on. In an embodiment, the distributer may instruct the DNN system 1240 to generate a DNN in accordance with the request. The DNN system 1240 may generate a DNN based on the information in the request. For instance, the DNN system 1240 can determine the structure of the DNN and/or train the DNN in accordance with the request.

In another embodiment, the distributer 1260 may select the DNN from a group of pre-existing DNNs based on the request. The distributer 1260 may select a DNN for a particular client device 1220 based on the size of the DNN and available resources of the client device 1220. In embodiments where the distributer 1260 determines that the client device 1220 has limited memory or processing power, the distributer 1260 may select a compressed DNN for the client device 1220, as opposed to an uncompressed DNN that has a larger size. The distributer 1260 then transmits the DNN generated or selected for the client device 1220 to the client device 1220.

In some embodiments, the distributer 1260 may receive feedback from the client device 1220. For example, the distributer 1260 receives new training data from the client device 1220 and may send the new training data to the DNN system 1240 for further training the DNN. As another example, the feedback includes an update of the available computing resource on the client device 1220. The distributer 1260 may send a different DNN to the client device 1220 based on the update. For instance, after receiving the feedback indicating that the computing resources of the client device 1220 have been reduced, the distributer 1260 sends a DNN of a smaller size to the client device 1220.

The client devices 1220 receive DNNs from the distributer 1260 and applies the DNNs to perform machine learning tasks, e.g., to solve problems or answer questions. In various embodiments, the client devices 1220 input images into the DNNs and use the output of the DNNs for various applications, e.g., visual reconstruction, augmented reality, robot localization and navigation, medical diagnosis, weather prediction, and so on. A client device 1220 may be one or more computing devices capable of receiving user input as well as transmitting and/or receiving data via the network 1230. In one embodiment, a client device 1220 is a conventional computer system, such as a desktop or a laptop computer. Alternatively, a client device 1220 may be a device having computer functionality, such as a personal digital assistant (PDA), a mobile telephone, a smartphone, an autonomous vehicle, or another suitable device. A client device 1220 is configured to communicate via the network 1230. In one embodiment, a client device 1220 executes an application allowing a user of the client device 1220 to interact with the deep learning server 1210 (e.g., the distributer 1260 of the deep learning server 1210). The client device 1220 may request DNNs or send feedback to the distributer 1260 through the application. For example, a client device 1220 executes a browser application to enable interaction between the client device 1220 and the deep learning server 1210 via the network 1230. In another embodiment, a client device 1220 interacts with the deep learning server 1210 through an application programming interface (API) running on a native operating system of the client device 1220, such as IOS® or ANDROID™.

In an embodiment, a client device 1220 is an integrated computing device that operates as a standalone network-enabled device. For example, the client device 1220 includes display, speakers, microphone, camera, and input device. In another embodiment, a client device 1220 is a computing device for coupling to an external media device such as a television or other external display and/or audio output system. In this embodiment, the client device 1220 may couple to the external media device via a wireless interface or wired interface (e.g., an HDMI (High-Definition Multimedia Interface) cable) and may utilize various functions of the external media device such as its display, speakers, microphone, camera, and input devices. Here, the client device 1220 may be configured to be compatible with a generic external media device that does not have specialized software, firmware, or hardware specifically for interacting with the client device 1220.

The network 1230 supports communications between the deep learning server 1210 and client devices 1220. The network 1230 may comprise any combination of local area and/or wide area networks, using both wired and/or wireless communication systems. In one embodiment, the network 1230 may use standard communications technologies and/or protocols. For example, the network 1230 may include communication links using technologies such as Ethernet, 12010.11, worldwide interoperability for microwave access (WiMAX), 3G, 4G, code division multiple access (CDMA), digital subscriber line (DSL), etc. Examples of networking protocols used for communicating via the network 1230 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1230 may be represented using any suitable format, such as hypertext markup language (HTML) or extensible markup language (XML). In some embodiments, all or some of the communication links of the network 1230 may be encrypted using any suitable technique or techniques.

Example DNN System

Figure 13:
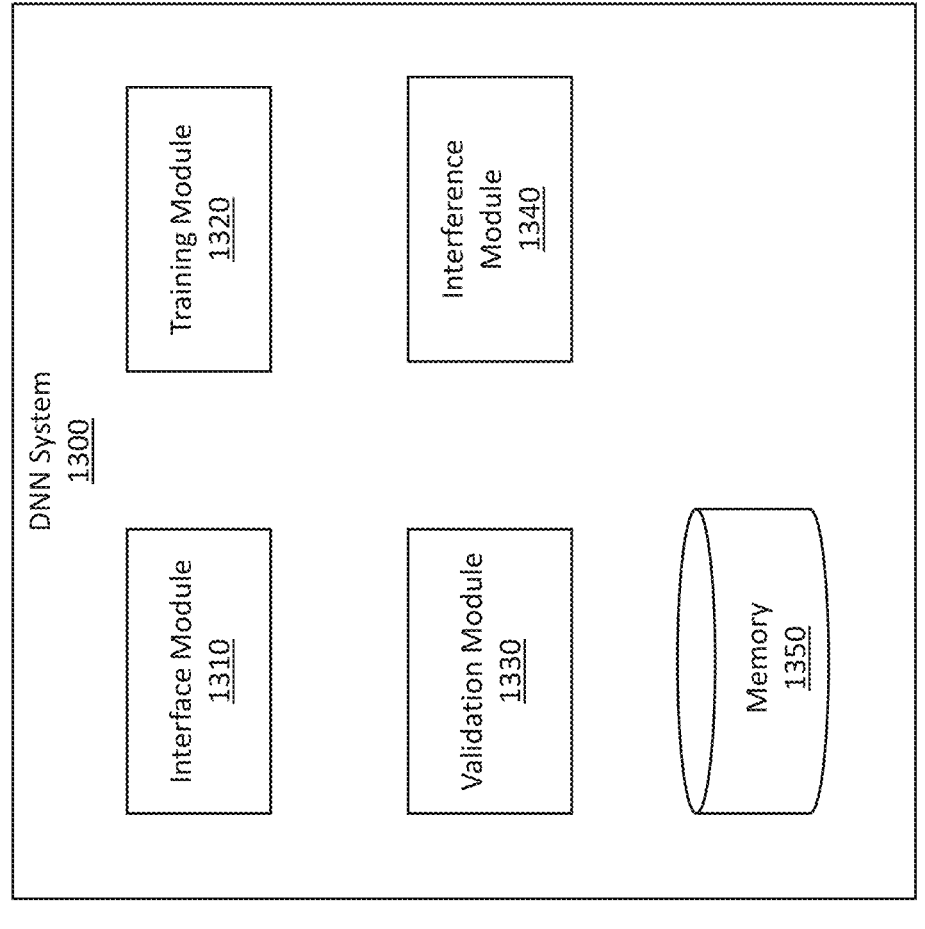
FIG. 13 is a block diagram of an example DNN system, in accordance with various embodiments.

FIG. 13 is a block diagram of an example DNN system 1300, in accordance with various embodiments. The whole DNN system 1300 or a part of the DNN system 1300 may be implemented in the computing device 1400 in FIG. 14. The DNN system 1300 trains DNNs for various tasks, such as image classification, learning relationships between biological cells (e.g., DNA, proteins, etc.), control behaviors for devices (e.g., robots, machines, etc.), and so on. The DNN system 1300 includes an interface module 1310, a training module 1320, a validation module 1330, an inference module 1340, and a memory 1350. In other embodiments, alternative configurations, different or additional components may be included in the DNN system 1300. Further, functionality attributed to a component of the DNN system 1300 may be accomplished by a different component included in the DNN system 1300 or a different system. The DNN system 1300 or a component of the DNN system 1300 (e.g., the training module 1320 or inference module 1340) may include the computing device 1400.

The interface module 1310 facilitates communications of the DNN system 1300 with other systems. For example, the interface module 1310 establishes communications between the DNN system 1300 with an external database to receive data that can be used to train DNNs or input into DNNs to perform tasks. As another example, the interface module 1310 supports the DNN system 1300 to distribute DNNs to other systems, e.g., computing devices configured to apply DNNs to perform tasks.

The training module 1320 trains DNNs by using a training dataset. The training module 1320 forms the training dataset. In an embodiment where the training module 1320 trains an DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 1330 to validate performance of a trained DNN. The portion of the training dataset not including the tuning subset and the validation subset may be used to train the DNN.

The training module 1320 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the DNN. An epoch may include one or more batches. The number of epochs may be 13, 130, 500, 1300, or even larger.

The training module 1320 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer.

The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include 3 channels). A pooling layer is used to reduce the spatial volume of input image after convolution. It is used between 2 convolution layers. A fully connected layer involves weights, biases, and neurons. It connects neurons in one layer to neurons in another layer. It is used to classify images between different category by training.

In the process of defining the architecture of the DNN, the training module 1320 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 1320 defines the architecture of the DNN, the training module 1320 inputs a training dataset into the DNN. The training dataset includes a plurality of training samples. An example of a training sample includes an object in an image and a ground-truth label of the object. The training module 1320 modifies the parameters inside the DNN ("internal parameters of the DNN") to minimize the error between labels of the training objects that are generated by the DNN and the ground-truth labels of the objects. The internal parameters include weights of filters in the convolutional layers of the DNN. In some embodiments, the training module 1320 uses a cost function to minimize the error.

The training module 1320 may train the DNN for a predetermined number of epochs. The number of epochs is a hyperparameter that defines the number of times that the deep learning algorithm will work through the entire training dataset. One epoch means that each sample in the training dataset has had an opportunity to update internal parameters of the DNN. After the training module 1320 finishes the predetermined number of epochs, the training module 1320 may stop updating the parameters in the DNN. The DNN having the updated parameters is referred to as a trained DNN.

The validation module 1330 verifies accuracy of trained DNNs. In some embodiments, the validation module 1330 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 1330 may determine an accuracy score measuring the precision, recall, or a combination of precision and recall of the DNN. The validation module 1330 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 1330 may compare the accuracy score with a threshold score. In an example where the validation module 1330 determines that the accuracy score of the augmented model is lower than the threshold score, the validation module 1330 instructs the training module 1320 to re-train the DNN. In one embodiment, the training module 1320 may iteratively re-train the DNN until the occurrence of a stopping condition, such as the accuracy measurement indication that the DNN may be sufficiently accurate, or a number of training rounds having taken place.

The inference module 1340 applies the trained or validated DNN to perform tasks. For instance, the inference module 1340 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 1340 distributes the DNN to other systems, e.g., computing devices in communication with the DNN system 1300, for the other systems to apply the DNN to perform the tasks.

The memory 1350 stores data received, generated, used, or otherwise associated with the DNN system 1300. For example, the memory 1350 stores the datasets used by the training module 1320 and validation module 1330. The memory 1350 may also store data generated by the training module 1320 and validation module 1330, such as the hyperparameters for training DNNs, internal parameters of trained DNNs (e.g., values of tunable parameters of activation functions, such as Fractional Adaptive Linear Units (FALUs)), etc. In the embodiment of FIG. 13, the memory 1350 is a component of the DNN system 1300. In other embodiments, the memory 1350 may be external to the DNN system 1300 and communicate with the DNN system 1300 through a network.

Example Computing Device

Figure 14:
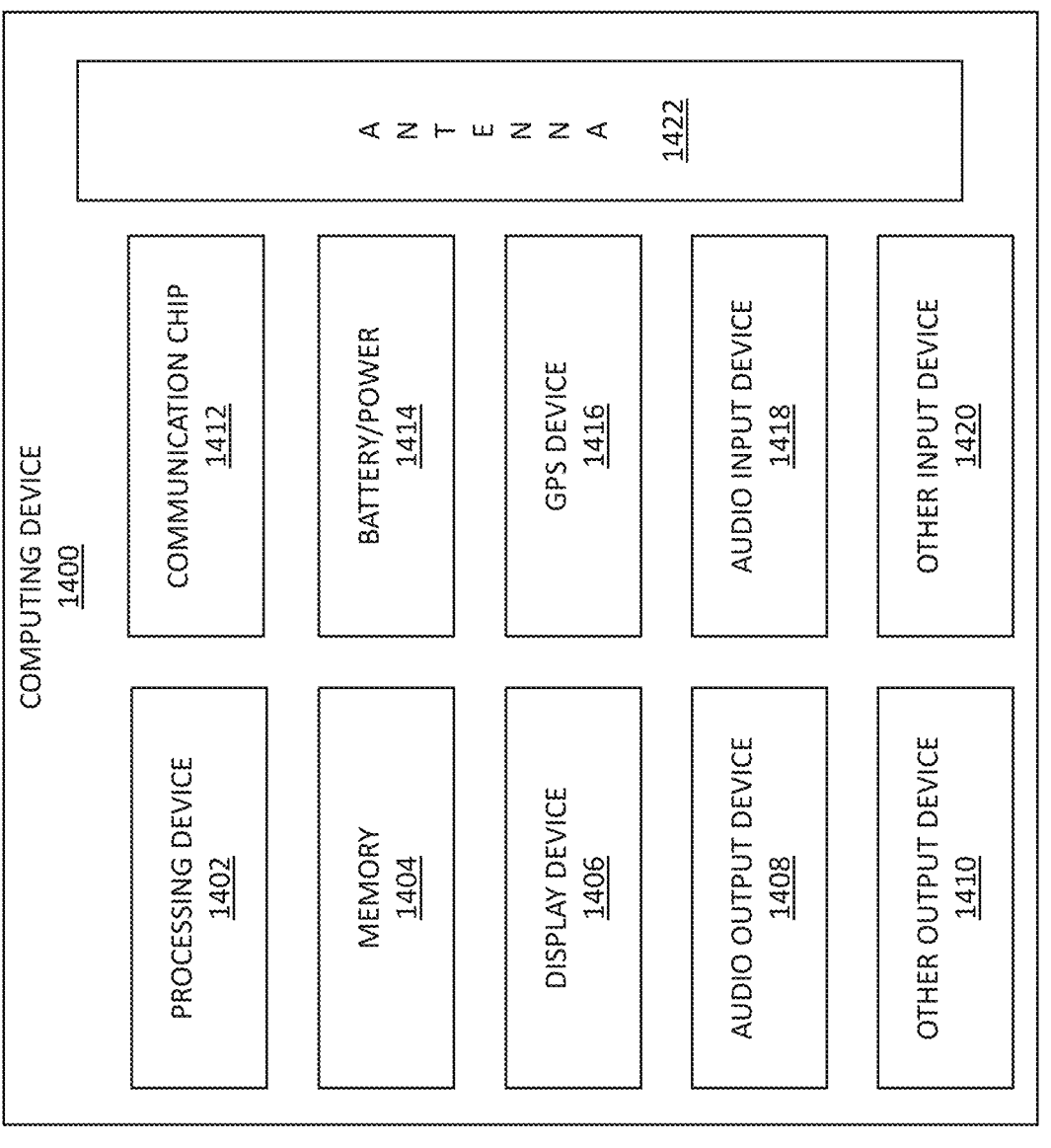
FIG. 14 is a block diagram of an example computing device, in accordance with various embodiments.

FIG. 14 is a block diagram of an example computing device 1400, in accordance with various embodiments. In some embodiments, the computing device 1400 can be used as the DNN system 1300 in FIG. 13. A number of components are illustrated in FIG. 14 as included in the computing device 1400, but any one or more of these components may be omitted or duplicated, as suitable for the application. In some embodiments, some or all of the components included in the computing device 1400 may be attached to one or more motherboards. In some embodiments, some or all of these components are fabricated onto a single system on a chip (SoC) die. Additionally, in various embodiments, the computing device 1400 may not include one or more of the components illustrated in FIG. 14, but the computing device 1400 may include interface circuitry for coupling to the one or more components. For example, the computing device 1400 may not include a display device 1406, but may include display device interface circuitry (e.g., a connector and driver circuitry) to which a display device 1406 may be coupled. In another set of examples, the computing device 1400 may not include an audio input device 1418 or an audio output device 1408, but may include audio input or output device interface circuitry (e.g., connectors and supporting circuitry) to which an audio input device 1418 or audio output device 1408 may be coupled.

The computing device 1400 may include a processing device 1402 (e.g., one or more processing devices). The processing device 1402 processes electronic data from registers and/or memory to transform that electronic data into other electronic data that may be stored in registers and/or memory. The computing device 1400 may include a memory 1404, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1404 may include memory that shares a die with the processing device 1402. In some embodiments, the memory 1404 includes one or more non-transitory computer-readable media storing instructions executable to perform operations for deep learning, e.g., the method 1000 described above in conjunction with FIG. 10 or some operations performed by the deconvolution module 810 described above in conjunction with FIG. 8. The instructions stored in the one or more non-transitory computer-readable media may be executed by the processing device 2402.

In some embodiments, the computing device 1400 may include a communication chip 1412 (e.g., one or more communication chips). For example, the communication chip 1412 may be configured for managing wireless communications for the transfer of data to and from the computing device 1400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1412 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1412 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1412 may operate in accordance with other wireless protocols in other embodiments. The computing device 1400 may include an antenna 1422 to facilitate wireless communications and/or to receive other wireless communications (such as AM or FM radio transmissions).

In some embodiments, the communication chip 1412 may manage wired communications, such as electrical, optical, or any other suitable communication protocols (e.g., the Ethernet). As noted above, the communication chip 1412 may include multiple communication chips. For instance, a first communication chip 1412 may be dedicated to shorter-range wireless communications such as Wi-Fi or Bluetooth, and a second communication chip 1412 may be dedicated to longer-range wireless communications such as global positioning system (GPS), EDGE, GPRS, CDMA, WiMAX, LTE, EV-DO, or others. In some embodiments, a first communication chip 1412 may be dedicated to wireless communications, and a second communication chip 1412 may be dedicated to wired communications.

The computing device 1400 may include battery/power circuitry 1414. The battery/power circuitry 1414 may include one or more energy storage devices (e.g., batteries or capacitors) and/or circuitry for coupling components of the computing device 1400 to an energy source separate from the computing device 1400 (e.g., AC line power).

The computing device 1400 may include a display device 1406 (or corresponding interface circuitry, as discussed above). The display device 1406 may include any visual indicators, such as a heads-up display, a computer monitor, a projector, a touchscreen display, a liquid crystal display (LCD), a light-emitting diode display, or a flat panel display, for example.

The computing device 1400 may include an audio output device 1408 (or corresponding interface circuitry, as discussed above). The audio output device 1408 may include any device that generates an audible indicator, such as speakers, headsets, or earbuds, for example.

The computing device 1400 may include an audio input device 1418 (or corresponding interface circuitry, as discussed above). The audio input device 1418 may include any device that generates a signal representative of a sound, such as microphones, microphone arrays, or digital instruments (e.g., instruments having a musical instrument digital interface (MIDI) output).

The computing device 1400 may include a GPS device 1416 (or corresponding interface circuitry, as discussed above). The GPS device 1416 may be in communication with a satellite-based system and may receive a location of the computing device 1400, as known in the art.

The computing device 1400 may include another output device 1410 (or corresponding interface circuitry, as discussed above). Examples of the other output device 1410 may include an audio codec, a video codec, a printer, a wired or wireless transmitter for providing information to other devices, or an additional storage device.

The computing device 1400 may include another input device 1420 (or corresponding interface circuitry, as discussed above). Examples of the other input device 1420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1400 may have any desired form factor, such as a handheld or mobile computer system (e.g., a cell phone, a smart phone, a mobile internet device, a music player, a tablet computer, a laptop computer, a netbook computer, an ultrabook computer, a PDA, an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 1400 may be any other electronic device that processes data.

SELECT EXAMPLES

The following paragraphs provide various examples of the embodiments disclosed herein.

Example 1 provides a method of deep learning, the method including generating an upsampled input tensor by adding new input activations into an input tensor of a deconvolution, where the input tensor including a plurality of input activations; identifying a plurality of subtensors from the upsampled input tensor; determining distributions of the plurality of input activations in the plurality of subtensors; and decomposing a kernel of the deconvolution into a plurality of reduced kernels based on the distributions, where the kernel includes a plurality of weights, and each reduced kernel includes a subset of the plurality of weights, where the plurality of reduced kernels and the input tensor are used to produce an output tensor of the deconvolution.

Example 2 provides the method of example 1, where generating the upsampled input tensor includes determining a padding size for the upsampled input tensor based on a size of the kernel and a padding size of the deconvolution; and adding at least some of the new input activations to edges of the input tensor based on the padding size.

Example 3 provides the method of example 2, where generating the upsampled input tensor further includes inserting some other ones of the new input activations between adjacent input activations of the plurality of input activations based on a stride size of the deconvolution.

Example 4 provides the method of any of the preceding examples, where a size of the plurality of subtensors is the same as a size of the kernel.

Example 5 provides the method of any of the preceding examples, further including classifying the plurality of subtensors into a plurality of groups, where a group includes a subset of the plurality of subtensors, subtensors in the subset have an activation distribution pattern, and the activation distribution pattern indicates one or more positions of one or more input activations in each of the subtensors in the subset; and generating a reduced kernel of the plurality of reduced kernels based on the activation distribution pattern.

Example 6 provides the method of example 5, where generating the reduced kernel of the plurality of reduced kernels based on the activation distribution pattern includes identifying one or more weights from the kernel based on the one or more positions of one or more input activations in each of the subtensors in the subset, where one or more positions of the one or more weights in the kernel are the same as the one or more positions of one or more input activations in each of the subtensors; and including the one or more weights in the reduced kernel.

Example 7 provides the method of example 5 or 6, where the reduced kernel and the input tensor are used for a reduced convolution, the reduced convolution produces output activations of the output tensor, and positions of the output activations in the output tensor are determined based on positions of the subtensors in the subset in the upsampled input tensor.

Example 8 provides the method of any of the preceding examples, where the plurality of reduced kernels includes a first reduced kernel and a second reduced kernel, and the first reduced kernel and the second reduced kernel have different sizes.

Example 9 provides the method of any of the preceding examples, where the output tensor includes a plurality of output activations, and a reduced kernel of the plurality of reduced kernels is to be used to produce one or more output activations of the plurality of output activations.

Example 10 provides the method of any of the preceding examples, where the output tensor includes a first output activation produced by using a first reduced kernel of the plurality of reduced kernels, the output tensor further includes second output activations produced by a second reduced kernel of the plurality of reduced kernels, and the first output activation is arranged between the second output activations in the output tensor.

Example 11 provides one or more non-transitory computer-readable media storing instructions executable to perform operations for deep learning, the operations including generating an upsampled input tensor by adding new input activations into an input tensor of a deconvolution, where the input tensor including a plurality of input activations; identifying a plurality of subtensors from the upsampled input tensor; determining distributions of the plurality of input activations in the plurality of subtensors; and decomposing a kernel of the deconvolution into a plurality of reduced kernels based on the distributions, where the kernel includes a plurality of weights, and each reduced kernel includes a subset of the plurality of weights, where the plurality of reduced kernels and the input tensor are used to produce an output tensor of the deconvolution.

Example 12 provides the one or more non-transitory computer-readable media of example 11, where generating the upsampled input tensor includes determining a padding size for the upsampled input tensor based on a size of the kernel and a padding size of the deconvolution; and adding at least some of the new input activations to edges of the input tensor based on the padding size.

Example 13 provides the one or more non-transitory computer-readable media of example 12, where generating the upsampled input tensor further includes inserting some other ones of the new input activations between adjacent input activations of the plurality of input activations based on a stride size of the deconvolution.

Example 14 provides the one or more non-transitory computer-readable media of any one of examples 11-13, where a size of the plurality of subtensors is the same as a size of the kernel.

Example 15 provides the one or more non-transitory computer-readable media of any one of examples 11-14, where the operations further include classifying the plurality of subtensors into a plurality of groups, where a group includes a subset of the plurality of subtensors, subtensors in the subset have an activation distribution pattern, and the activation distribution pattern indicates one or more positions of one or more input activations in each of the subtensors in the subset; and generating a reduced kernel of the plurality of reduced kernels based on the activation distribution pattern.

Example 16 provides the one or more non-transitory computer-readable media of example 15, where generating the reduced kernel of the plurality of reduced kernels based on the activation distribution pattern includes identifying one or more weights from the kernel based on the one or more positions of one or more input activations in each of the subtensors in the subset, where one or more positions of the one or more weights in the kernel are the same as the one or more positions of one or more input activations in each of the subtensors; and including the one or more weights in the reduced kernel.

Example 17 provides the one or more non-transitory computer-readable media of example 15 or 16, where the reduced kernel and the input tensor are used for a reduced convolution, the reduced convolution produces output activations of the output tensor, and positions of the output activations in the output tensor are determined based on positions of the subtensors in the subset in the upsampled input tensor.

Example 18 provides the one or more non-transitory computer-readable media of any one of examples 11-17, where the plurality of reduced kernels includes a first reduced kernel and a second reduced kernel, and the first reduced kernel and the second reduced kernel have different sizes.

Example 19 provides the one or more non-transitory computer-readable media of any one of examples 11-18, where the output tensor includes a plurality of output activations, and a reduced kernel of the plurality of reduced kernels is to be used to produce one or more output activations of the plurality of output activations.

Example 20 provides the one or more non-transitory computer-readable media of any one of examples 11-19, where the output tensor includes a first output activation produced by using a first reduced kernel of the plurality of reduced kernels, the output tensor further includes second output activations produced by a second reduced kernel of the plurality of reduced kernels, and the first output activation is arranged between the second output activations in the output tensor.

Example 21 provides an apparatus for training a target neural network, the apparatus including a computer processor for executing computer program instructions; and a non-transitory computer-readable memory storing computer program instructions executable by the computer processor to perform operations including generate an upsampled input tensor by adding new input activations into an input tensor of a deconvolution, where the input tensor including a plurality of input activations, identify a plurality of subtensors from the upsampled input tensor, determine distributions of the plurality of input activations in the plurality of subtensors, and decompose a kernel of the deconvolution into a plurality of reduced kernels based on the distributions, where the kernel includes a plurality of weights, and each reduced kernel includes a subset of the plurality of weights, where the plurality of reduced kernels and the input tensor are used to produce an output tensor of the deconvolution.

Example 22 provides the apparatus of example 21, where generating the upsampled input tensor includes determining a padding size for the upsampled input tensor based on a size of the kernel and a padding size of the deconvolution; and adding at least some of the new input activations to edges of the input tensor based on the padding size.

Example 23 provides the apparatus of example 21 or 22, where a size of the plurality of subtensors is the same as a size of the kernel.

Example 24 provides the apparatus of any one of examples 21-23, where the operations further include classifying the plurality of subtensors into a plurality of groups, where a group includes a subset of the plurality of subtensors, subtensors in the subset have an activation distribution pattern, and the activation distribution pattern indicates one or more positions of one or more input activations in each of the subtensors in the subset; and generating a reduced kernel of the plurality of reduced kernels based on the activation distribution pattern.

Example 25 provides the apparatus of any one of examples 21-24, where the output tensor includes a first output activation produced by using a first reduced kernel of the plurality of reduced kernels, the output tensor further includes second output activations produced by a second reduced kernel of the plurality of reduced kernels, and the first output activation is arranged between the second output activations in the output tensor.

ADDITIONAL SELECT EXAMPLES

Example 1 provides a method of deep learning, the method including receiving a plurality of reduced kernels that is generated by decomposing a kernel of a deconvolution, where the kernel includes a plurality of weights, and each reduced kernel includes a subset of the plurality of weights; receiving an input tensor of the deconvolution, where the input tensor includes a plurality of input activations, and the input tensor has a size determined by a number of input activations in a row or column in the input tensor; performing a plurality of convolutions with the input tensor and the plurality of reduced kernels, where each respective convolution of the plurality of convolutions is performed on the input tensor and a different one of the plurality of reduced kernels; and generating an output tensor of the deconvolution, where the output tensor includes a plurality of output activations produced from the plurality of convolutions, the output tensor has a size determined by a number of output activations in a row or column in the output tensor.

Example 2 provides the method of example 1, where the kernel is decomposed by generating an upsampled input tensor by adding new input activations into the input tensor, where the new input activations have values of zero; and decomposing the kernel based on distributions of the plurality the input activations in the upsampled input tensor.

Example 3 provides the method of example 1 or 2, where generating the upsampled input tensor includes determining a padding size for the upsampled input tensor based on a size of the kernel and a padding size of the deconvolution; and adding the new input activations into the input tensor based on the padding size.

Example 4 provides the method of example 3, where the upsampled input tensor has a size that is larger than the size of the output tensor.

Example 5 provides the method of example 3 or 4, where the kernel is decomposed further based on a size of the kernel.

Example 6 provides the method of example 5, where the kernel is decomposed by identifying a plurality of subtensors from the upsampled input tensor, where each subtensor has a size same as the size of the kernel; classifying the plurality of subtensors into a plurality of groups, where a group includes a subset of the plurality of subtensors, subtensors in the subset have a same distribution pattern of one or more input activations; and generating a reduced kernel of the plurality of reduced kernels based on the same distribution pattern.

Example 7 provides the method of any of the preceding examples, where the plurality of reduced kernels includes a first reduced kernel and a second reduced kernel, and a number of weights in the first reduced kernel is different from the number of weights in the second reduced kernel.

Example 8 provides the method of any of the preceding examples, where the plurality of reduced kernels includes a first reduced kernel and a second reduced kernel, the first reduced kernel includes one or more weights arranged in a first matrix, the second reduced kernel includes one or more other weights arranged in a second matrix, and the first matrix has a different shape form the second matrix.

Example 9 provides the method of any of the preceding examples, where generating the output tensor includes determining positions of the plurality of output activations in the output tensor based on a stride size of the deconvolution.

Example 10 provides the method of any of the preceding examples, where the output tensor includes a first output activation produced by a first convolution of the plurality of convolutions, the output tensor further includes second output activations produced by a second convolution of the plurality of convolutions, and the first output activation is arranged between the second output activations in the output tensor.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method of deep learning, the method comprising:
generating an upsampled input tensor by adding new input activations into an input tensor of a deconvolution, wherein the input tensor comprising a plurality of input activations, wherein a dimension of the upsampled input tensor is larger than a dimension of the input tensor;
identifying a plurality of subtensors from the upsampled input tensor;
determining distributions of the plurality of input activations in the plurality of subtensors;
generating a plurality of reduced kernels from a kernel of the deconvolution based on the distributions, wherein the kernel comprises a plurality of weights, and each reduced kernel comprises a subset of the plurality of weights, and wherein generating the plurality of reduced kernels comprises:
classifying the plurality of subtensors into a plurality of groups, wherein a group comprises a subset of the plurality of subtensors, subtensors in the subset have an activation distribution pattern, and the activation distribution pattern indicates one or more positions of one or more input activations in each of the subtensors in the subset, and
generating a reduced kernel of the plurality of reduced kernels based on the activation distribution pattern; and
providing, to a neural network accelerator, the plurality of reduced kernels and the input tensor, wherein the neural network accelerators is to compute an output tensor of the deconvolution by performing a plurality of convolution operations using the plurality of reduced kernels and the input tensor, each convolution operation performed using a different one of the plurality of reduced kernels and the input tensor, wherein a dimension of the output tensor of the deconvolution is larger than the dimension of the input tensor but smaller than the dimension of the upsampled input tensor.

2. The method of claim 1, wherein generating the upsampled input tensor comprises:
determining a padding size for the upsampled input tensor based on a size of the kernel and a padding size of the deconvolution; and
adding at least some of the new input activations to edges of the input tensor based on the padding size.

3. The method of claim 2, wherein generating the upsampled input tensor further comprises:
inserting some other ones of the new input activations between adjacent input activations of the plurality of input activations based on a stride size of the deconvolution.

4. The method of claim 1, wherein a size of the plurality of subtensors is the same as a size of the kernel.

5. The method of claim 1, wherein generating the reduced kernel of the plurality of reduced kernels based on the activation distribution pattern comprises:
identifying one or more weights from the kernel based on the one or more positions of one or more input activations in each of the subtensors in the subset, wherein one or more positions of the one or more weights in the kernel are the same as the one or more positions of one or more input activations in each of the subtensors; and
including the one or more weights in the reduced kernel.

6. The method of claim 1, wherein a convolution operation of the plurality of convolution operations are performed on the reduced kernel and the input tensor to produce output activations in the output tensor, and positions of the output activations in the output tensor are determined based on positions of the subtensors in the subset in the upsampled input tensor.

7. The method of claim 1, wherein the plurality of reduced kernels comprises a first reduced kernel and a second reduced kernel, and the first reduced kernel and the second reduced kernel have different numbers of weights.

8. The method of claim 1, wherein the output tensor comprises a plurality of output activations, and a reduced kernel of the plurality of reduced kernels is to be used to produce one or more output activations of the plurality of output activations.

9. The method of claim 1, wherein:
the output tensor comprises a first output activation produced by using a first reduced kernel of the plurality of reduced kernels,
the output tensor further comprises second output activations produced by a second reduced kernel of the plurality of reduced kernels, and
the first output activation is arranged between the second output activations in the output tensor.

10. One or more non-transitory computer-readable media storing instructions executable to perform operations for deep learning, the operations comprising:
generating an upsampled input tensor by adding new input activations into an input tensor of a deconvolution, wherein the input tensor comprising a plurality of input activations, wherein a dimension of the upsampled input tensor is larger than a dimension of the input tensor;
identifying a plurality of subtensors from the upsampled input tensor;
determining distributions of the plurality of input activations in the plurality of subtensors;
generating a plurality of reduced kernels from a kernel of the deconvolution based on the distributions, wherein the kernel comprises a plurality of weights, and each reduced kernel comprises a subset of the plurality of weights, and wherein generating the plurality of reduced kernels comprises:

classifying the plurality of subtensors into a plurality of groups, wherein a group comprises a subset of the plurality of subtensors, subtensors in the subset have an activation distribution pattern, and the activation distribution pattern indicates one or more positions of one or more input activations in each of the subtensors in the subset, and generating a reduced kernel of the plurality of reduced kernels based on the activation distribution pattern; and providing, to a neural network accelerator, the plurality of reduced kernels and the input tensor, wherein the neural network accelerators is to compute an output tensor of the deconvolution by performing a plurality of convolution operations using the plurality of reduced kernels and the input tensor, each convolution operation performed using a different one of the plurality of reduced kernels and the input tensor, wherein a dimension of the output tensor of the deconvolution is larger than the dimension of the input tensor but smaller than the dimension of the upsampled input tensor.

11. The one or more non-transitory computer-readable media of claim 10, wherein generating the upsampled input tensor comprises:

determining a padding size for the upsampled input tensor based on a size of the kernel and a padding size of the deconvolution; and adding at least some of the new input activations to edges of the input tensor based on the padding size.

12. The one or more non-transitory computer-readable media of claim 11, wherein generating the upsampled input tensor further comprises:

inserting some other ones of the new input activations between adjacent input activations of the plurality of input activations based on a stride size of the deconvolution.

13. The one or more non-transitory computer-readable media of claim 10, wherein a size of the plurality of subtensors is the same as a size of the kernel.

14. The one or more non-transitory computer-readable media of claim 10, wherein generating the reduced kernel of the plurality of reduced kernels based on the activation distribution pattern comprises:

identifying one or more weights from the kernel based on the one or more positions of one or more input activations in each of the subtensors in the subset, wherein one or more positions of the one or more weights in the kernel are the same as the one or more positions of one or more input activations in each of the subtensors; and including the one or more weights in the reduced kernel.

15. The one or more non-transitory computer-readable media of claim 10, wherein a convolution operation of the plurality of convolution operations are performed on the reduced kernel and the input tensor to produce output activations in the output tensor, and positions of the output activations in the output tensor are determined based on positions of the subtensors in the subset in the upsampled input tensor.

16. The one or more non-transitory computer-readable media of claim 10, wherein the plurality of reduced kernels comprises a first reduced kernel and a second reduced kernel, and the first reduced kernel and the second reduced kernel have different numbers of weights.

17. The one or more non-transitory computer-readable media of claim 10, wherein the output tensor comprises a plurality of output activations, and a reduced kernel of the plurality of reduced kernels is to be used to produce one or more output activations of the plurality of output activations.

18. The one or more non-transitory computer-readable media of claim 10, wherein:

the output tensor comprises a first output activation produced by using a first reduced kernel of the plurality of reduced kernels, the output tensor further comprises second output activations produced by a second reduced kernel of the plurality of reduced kernels, and the first output activation is arranged between the second output activations in the output tensor.

19. An apparatus for training a target neural network, the apparatus comprising:

a computer processor for executing computer program instructions; and a non-transitory computer-readable memory storing computer program instructions executable by the computer processor to perform operations comprising:

generate an upsampled input tensor by adding new input activations into an input tensor of a deconvolution, wherein the input tensor comprising a plurality of input activations, wherein a dimension of the upsampled input tensor is larger than a dimension of the input tensor, identify a plurality of subtensors from the upsampled input tensor, determining distributions of the plurality of input activations in the plurality of subtensors, generating a plurality of reduced kernels from a kernel of the deconvolution based on the distributions, wherein the kernel comprises a plurality of weights, and each reduced kernel comprises a subset of the plurality of weights, and wherein generating the plurality of reduced kernels comprises:

classifying the plurality of subtensors into a plurality of groups, wherein a group comprises a subset of the plurality of subtensors, subtensors in the subset have an activation distribution pattern, and the activation distribution pattern indicates one or more positions of one or more input activations in each of the subtensors in the subset, and generating a reduced kernel of the plurality of reduced kernels based on the activation distribution pattern, and providing, to a neural network accelerator, the plurality of reduced kernels and the input tensor, wherein the neural network accelerators is to compute an output tensor of the deconvolution by performing a plurality of convolution operations using the plurality of reduced kernels and the input tensor, each convolution operation performed using a different one of the plurality of reduced kernels and the input tensor, wherein a dimension of the output tensor of the deconvolution is larger than the dimension of the input tensor but smaller than the dimension of the upsampled input tensor.

20. The apparatus of claim 19, wherein generating the upsampled input tensor comprises:

determining a padding size for the upsampled input tensor based on a size of the kernel and a padding size of the deconvolution; and adding at least some of the new input activations to edges of the input tensor based on the padding size.

21. The apparatus of claim 19, wherein a size of the plurality of subtensors is the same as a size of the kernel.

22. The apparatus of claim 19, wherein:

the output tensor comprises a first output activation pro-
duced by using a first reduced kernel of the plurality of
reduced kernels, the output tensor further comprises second output activa-
tions produced by a second reduced kernel of the
plurality of reduced kernels, and the first output activation is arranged between the second
output activations in the output tensor.

* * * * *